(12) United States Patent
Hill

(10) Patent No.: US 6,490,382 B1
(45) Date of Patent: Dec. 3, 2002

(54) MICROELECTROMECHANICAL OPTICAL CROSS-CONNECT SWITCHES HAVING REDUCED NUMBERS OF REFLECTORS THEREIN AND METHODS OF OPERATING SAME

(75) Inventor: Edward A. Hill, Chapel Hill, NC (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/566,189

(22) Filed: May 5, 2000

(51) Int. Cl.[7] .............................................. G02B 6/35
(52) U.S. Cl. ........................................ 385/17; 385/18
(58) Field of Search ..................... 385/16–24; 359/124, 359/127, 128, 212–214, 220, 221

(56) References Cited

U.S. PATENT DOCUMENTS

| | | | |
|---|---|---|---|
| 5,841,917 A | * 11/1998 | Jungerman et al. | 385/15 |
| 6,134,357 A | * 10/2000 | MacDonald | 385/16 |
| 6,144,781 A | * 11/2000 | Goldstein et al. | 385/16 |
| 6,195,478 B1 | * 2/2001 | Fouquet | 385/16 |
| 6,317,530 B1 | * 11/2001 | Ford | 359/212 |

* cited by examiner

Primary Examiner—Akm E. Ullah
Assistant Examiner—Michelle R. Connelly
(74) Attorney, Agent, or Firm—Myers Bigel Sibley & Sajovec

(57) ABSTRACT

Reduced configuration Optical Cross-Connect (OXC) switches can include N inputs to the OXC switch and N outputs from the OXC switch, where N is at least 3. The N×N OXC switch provides N! states, wherein the N! states optically couple any one of the N inputs to any one of the N outputs. The N×N OXC switch also includes a number of switching nodes that are selectively optically coupled to the N inputs and N outputs. Each of the number of switching nodes is configurable in at least one of a switching configuration and a pass-through configuration to provide selectively switched optical radiation therefrom and wherein the number of switching nodes is equal to ceiling $[\ln(N!)/\ln(2)]$ to provide the N! states of the N×N OXC switch. The N×N OXC switch further includes at least one optical transmission apparatus coupled to at least two of the switching nodes. Related methods are also disclosed.

34 Claims, 16 Drawing Sheets

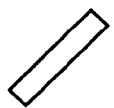 NON REFLECTING  REFLECTING
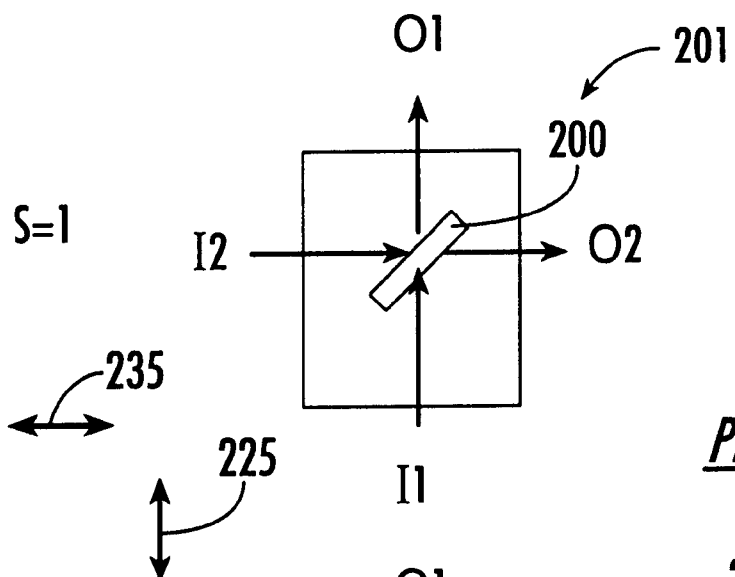
**FIG. 2A.
PRIOR ART**
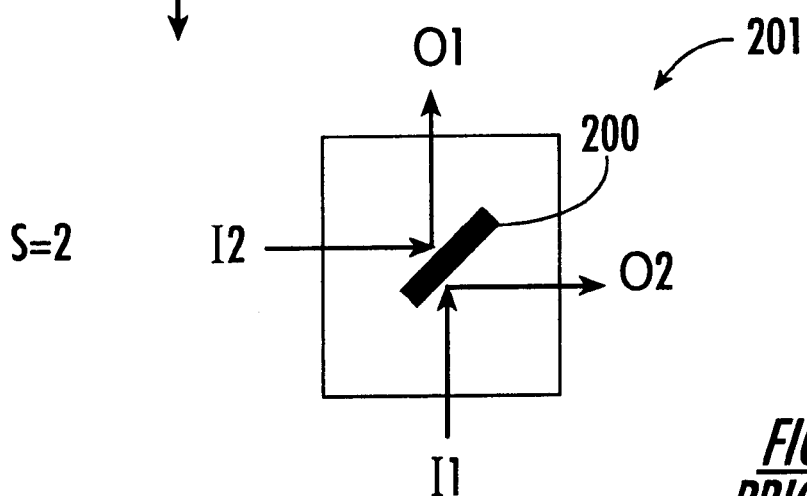
**FIG. 2B.
PRIOR ART**

| S | I1 | I2 |
|---|----|----|
| 1 | O1 | O2 |
| 2 | O2 | O1 |

FIG. 3.
PRIOR ART

| S | I1 | I2 | I3 | I4 |
|----|----|----|----|----|
| 1  | O1 | O2 | O3 | O4 |
| 2  | O1 | O3 | O4 | O2 |
| 3  | O1 | O4 | O2 | O3 |
| 4  | O1 | O2 | O4 | O3 |
| 5  | O1 | O4 | O3 | O2 |
| 6  | O1 | O3 | O2 | O4 |
| 7  | O2 | O3 | O4 | O1 |
| 8  | O2 | O4 | O1 | O3 |
| 9  | O2 | O1 | O3 | O4 |
| 10 | O2 | O3 | O1 | O4 |
| 11 | O2 | O1 | O4 | O3 |
| 12 | O2 | O4 | O3 | O1 |
| 13 | O3 | O4 | O1 | O2 |
| 14 | O3 | O1 | O2 | O4 |
| 15 | O3 | O2 | O4 | O1 |
| 16 | O3 | O4 | O2 | O1 |
| 17 | O3 | O2 | O1 | O4 |
| 18 | O3 | O1 | O4 | O2 |
| 19 | O4 | O1 | O2 | O3 |
| 20 | O4 | O2 | O3 | O1 |
| 21 | O4 | O3 | O1 | O2 |
| 22 | O4 | O1 | O3 | O2 |
| 23 | O4 | O3 | O2 | O1 |
| 24 | O4 | O2 | O1 | O3 |

FIG. 13.

| S | I1 | I2 | I3 |
|---|----|----|----|
| 1 | O1 | O2 | O3 |
| 2 | O1 | O3 | O2 |
| 3 | O2 | O1 | O3 |
| 4 | O3 | O2 | O1 |
| 5 | O2 | O3 | O1 |
| 6 | O3 | O1 | O2 |

FIG. 8.

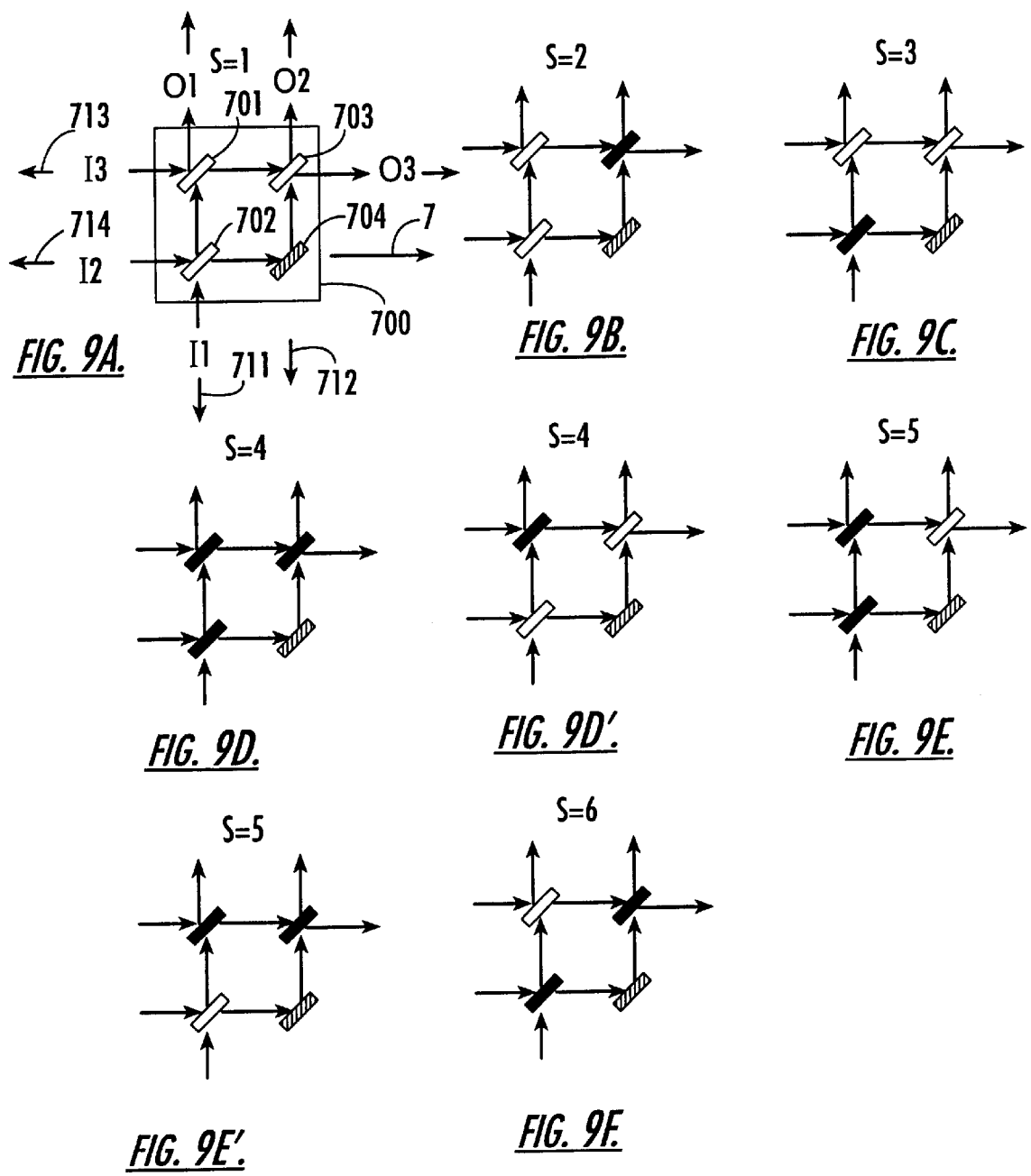

MICROELECTROMECHANICAL OPTICAL CROSS-CONNECT SWITCHES HAVING REDUCED NUMBERS OF REFLECTORS THEREIN AND METHODS OF OPERATING SAME

FIELD OF THE INVENTION

The present invention relates to microelectromechanical systems in general, and more particularly, to microelectromechanical optical switches.

BACKGROUND OF THE INVENTION

MicroElectroMechanical (MEM) technology has been used in a wide range of applications. For example, MEM devices have been used in optical switching systems to switch optical radiation from the switch inputs to selected switch outputs. Conventional optical switches, sometimes referred to as Optical Cross-Connect (OXC) switches can include an N×N array of reflectors to reflect optical radiation from any switch input to any switch output. Each input and output can be aligned with an associated row or column of the array. For example, in a 2×2 MEM OXC switch having 2 inputs and 2 outputs, the first and second inputs can be aligned with first and second rows of the 2×2 array and the first and second outputs can be aligned with first and second columns of the 2×2 array. In operation, a selected reflector of the 2×2 array can be used to reflect the optical radiation from any switch input to any switch output.

The selected reflector can be located in the array where the column associated with input and the row associated with the output intersect. The selected reflector can be placed in a reflecting position to reflect the optical radiation from the input to the selected output. At least some of the other reflectors can be placed in non-reflecting positions so as not to impede the propagation of the optical radiation from the input to the selected reflector and to the output.

As the number of inputs and outputs of conventional MEM OXC switches increase, so may the number of reflectors used to provide the operations thereof. The number of reflectors, R, used in a conventional N×N OXC generally can be expressed as:

$$R=N^2$$

Where N is the number of inputs and outputs of the switch. For example, a 2×2 OXC switch may include 4 reflectors, a 3×3 OXC switch may include 9 reflectors, and a 4×4 OXC switch may include 16 reflectors etc. A conventional 2×2 MEM OXC 100 is shown in FIG. 1.

Referring to FIG. 1, each of the reflectors 101–104 includes a reflective surface 105–108 and can be placed in either a reflecting or non-reflecting position. Accordingly, the MEM OXC 100 can be placed in $2^{N^2}$ possible configurations, where each configuration can be defined as a unique combination of reflector positions. Unfortunately, it may not be possible to use all of the $2^{N^2}$ configurations. In particular, some of reflector configurations may include configurations where two or more reflectors in a row or column of the array are in the reflecting state, thereby blocking the reflection of the optical radiation from the input to the output. For example, to switch optical radiation from input I1 to output O1, reflectors 102 and 103 are placed in non-reflecting positions to allow the optical radiation to propagate from input I1 to output O1. Therefore, some of the possible $2^{N^2}$ configurations may not allow the MEM OXC to operate properly.

Unfortunately, as the number of inputs and outputs increase, so may the number of reflectors. For example, a 5×5 OXC switch may use 52 reflectors, a 6×6 may use 36 and so on. It is known to reduce the number of reflectors by providing reflectors with reflective surfaces on opposite sides of the reflectors as shown, for example, in FIGS. 2A and 2B. According to FIGS. 2A and 2B, one reflector 200 can operate as a 2×2 MEM OXC switch 201. In particular, inputs I1 and I2 are oriented in first and second directions 225, 235 relative to the reflector 200. Outputs O1 and O2 are oriented in the first and second directions respectively relative to the reflector 200. When the reflector 200 is in the reflecting position, as shown in FIG. 2A, optical radiation can be reflected from input I1 to output O2 and from input I1 to output O1. When the reflector 200 is in the non-reflecting position, as shown in FIG. 2B, optical radiation can pass from the input I1 to the output O1 or from the input I1 to the output O2. Accordingly, the reflector 200 can operate as a 2×2 MEM OXC switch 201. Notwithstanding the above, there continues to exist a need to provide improved OXC switches having a reduced number of reflectors therein.

SUMMARY OF THE INVENTION

Embodiments of the present invention can allow MicroElectroMechanical (MEM) Optical Cross-Connect (OXC) switches to have a reduced number of reflectors by providing N inputs to the OXC switch and N outputs from the OXC switch, where N is at least 3. The N×N OXC switch provides N! states, wherein the N! states optically couple any one of the N inputs to any one of the N outputs. The N×N OXC switch also includes a number of switching nodes that are selectively optically coupled to the N inputs and N outputs. Each of the number of switching nodes is configurable in at least one of a switching configuration and a pass-through configuration to provide selectively switched optical radiation therefrom and wherein the number of switching nodes is equal to ceiling [ln(N!)/ln(2)] to provide the N! states of the N×N OXC switch. The N×N OXC switch further includes at least one optical transmission apparatus coupled to at least two of the switching nodes.

Reducing the number of switches used in an N×N MEM OXC switch may allow for N×N switches that use fewer actuators than conventional N×N switches. In particular, conventional N×N switches may include $N^2$ switches to provide N! switch settings. Such a conventional switch may use, for example, as little as 0.04% of the $2^{N^2}$ states for a 4×4 switch. In contrast, N×N switches according to the present invention can include ceiling [ln(N!)/ln(2)] reflectors. Such a 4×4 switch according to the present invention may utilize 75% of its respective possible states. For example, a conventional 4×4 switch may include 16 switches whereas an N×N switch according to the present invention may include 5 switches. Also, fewer switches and actuators may be formed on a smaller substrate area, thereby allowing a reduction in the footprint of an N×N switch according to the present invention.

In other embodiments according to the present invention a 2×2 array of reflectors is arranged in first and second rows and first and second columns. First, second and third inputs to the N×N OXC switch are selectively optically coupled to at least one of the 2×2 array of reflectors. First, second and third outputs from the N×N OXC switch are selectively optically coupled to at least one of the 2×2 array of reflectors. Related method embodiments for all of the above described OXC switches also may be provided. Accordingly, reduced numbers of reflectors and/or actuators may be used in optical cross connect switches.

In other embodiments according to the present invention, an N×N OXC switch includes a first movable reflector that is optically coupled to a first input and a second input. The first movable reflector receives first optical radiation in a first direction via the first input and receives second optical radiation in a second direction via the second input. The first moveable reflector provides the first optical radiation to a first output therefrom that propagates in the first direction when the first moveable reflector is in a non-reflecting position and provides the second optical radiation to the first output that propagates in the first direction when the first moveable reflector is in a reflecting position. A second movable reflector provides optical radiation from a third input thereto in the second direction to a second output therefrom when the second moveable reflector is in the non-reflecting position. An optical transmission apparatus optically couples the first output of the first moveable reflector to the third input of the second movable reflector and changes the direction of propagation of the optical radiation at the first output from the first direction to the second direction at the third input.

In other embodiments according to the present invention, the optical transmission apparatus is a fixed reflector. In yet other embodiments according to the present invention, the optical transmission apparatus is a linear or curvilinear waveguide.

BRIEF DESCRIPTION OF THE DRAWINGS

FIGS. 2A and 2B are plan views of a conventional 2×2 MEM OXC switch having one reflector.

FIG. 3 is a table of exemplary settings of a 2×2 MEM OXC switch.

FIG. 8 is a table that illustrates 6 switch settings for operations of embodiments of a 3×3 MEM OXC switch according to the present invention.

FIGS. 9A–9F is a series of plan views that illustrate embodiments of moveable reflector positions for each of the six switch settings of FIG. 8 in a 3×3 MEM OXC switch according to the present invention.

FIG. 13 is a table that illustrates 24 switch settings for operations of embodiment 6 a 4×4 MEM OXC switch according to the present invention.

DETAILED DESCRIPTION OF THE PREFERRED EMBODIMENTS

Figure 1:
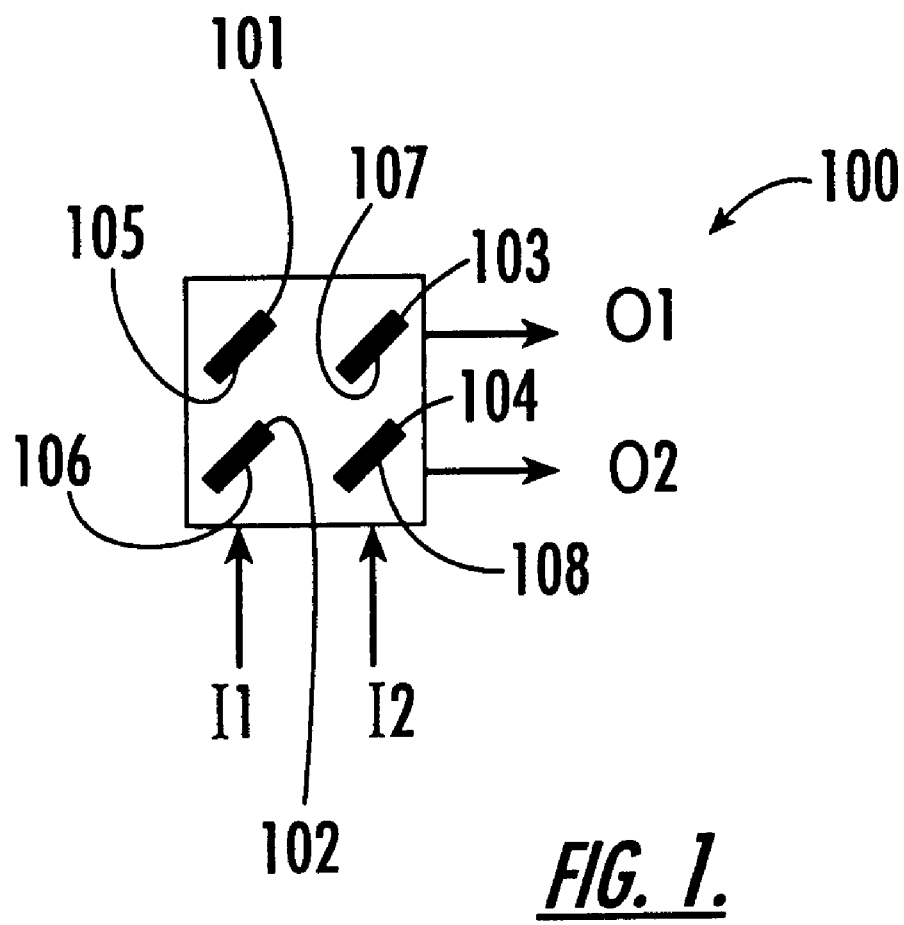
FIG. 1 is a plan view of a conventional 2×2 MicroElectroMechanical (MEM) Optical Cross-Connect (OXC) having four reflectors.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In the drawings, the size of regions may be exaggerated for clarity. Like numbers refer to like elements throughout. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the term "optical radiation" can include radiation that can be used to transmit data in a communications system, such as radiation in the visible, ultraviolet, infrared and/or other portions of the electromagnetic radiation spectrum. Although the present invention is described herein by reference to MEM OXC switches, it will be understood that the present invention may be utilized in other types of optical switches, such as non-MEM technology optical switches or nodes that switch optical radiation from a number of inputs to a number of outputs.

It will be understood that embodiments of the present invention are illustrated using plan views and schematic drawings. The schematic drawings include nodes that can switch optical radiation from inputs thereto to output therefrom. The schematic diagram therefore can illustrate generic processing of optical radiation.

According to the present invention, the number of reflectors used to provide the functionality of an N×N MEM OXC switch can be reduced. The invention stems, in-part, from the realization that reflectors can be thought of as binary digits (bits) that can be set to one of two states: reflecting and non-reflecting. The reflectors switch between the two states by moving between the reflecting and non-reflecting positions. The reflectors can function as switches that couple any input thereto to any output thereof. This binary operation can be used to determine a reduced number of moveable reflectors that can provide the needed functions of the N×N switch. The movement of the reflectors can be provided by local or global actuation using, for example, magnetic or mechanical actuation. Mechanical actuation of reflectors is described, for example, in U.S. patent application Ser. No.

09/542,170, entitled "Microelectromechanical Optical Cross-Connect Switches Including Mechanical Actuators and Methods of Operating Same" which is commonly assigned to the assignee of the present application and is hereby incorporated herein by reference. Magnetically actuated MEM OXC switches are described further, for example, in U.S. patent application Ser. No. 09/489,264 entitled "MEMs Optical Cross-Connect Switch", the disclosure of which is hereby incorporated herein by reference in its entirety. Other types of local and/or global actuation may be used.

Specifically, an N×N switch can provide any one of N! switch settings, where a switch setting is defined as switching N inputs to N outputs. For example, FIG. 3 is a table of exemplary settings of a 2×2 MEM OXC switch. As shown in FIG. 3, the 2×2 MEM OXC switch has 2! or 2 settings. In setting 1, input I1 is optically coupled to output O1 and input I1 is optically coupled to output O2. In setting 2, input I1 is optically coupled to output O2 and input I1 is optically coupled to output O1.

The reduced number of "bits" (or moveable reflectors) needed to provide all of the switch settings of an N×N MEM OXC switch can be expressed as:

$$2^M >= N! \quad (1)$$

where M is the smallest integer value which makes equation (1) true. Solving for the number of "bits":

$$M = \text{ceiling} [\ln(N!)/\ln(2)] \quad (2)$$

where M is the minimum number of moveable reflectors, N is the number of inputs and outputs of the switch, ln denotes the natural logarithm, the "!" denotes the factorial operation, and the "ceiling " operator raises a fractional number to the next higher integer (e.g., ceiling (0.5)=1). For example, 3 moveable reflectors can be used to implement a reduced 3×3 MEM OXC switch according to the present invention and 5 moveable reflectors can be used to implement a reduced 4×4 MEM OXC switch according to the present invention.

Reducing the number of reflectors used in an N×N MEM OXC switch may allow for N×N switches that use fewer actuators than conventional N×N switches. In particular, conventional N×N switches may include $N^2$ reflectors to provide N! switch settings. Such a conventional switch may use as little as 0.04% of the $N^2$ states in a 4×4 switch. In contrast, N×N switches according to the present invention can include ceiling [ln(N!)/ln(2)] switching reflectors. Such a 4×4 switch according to the present invention may utilize 75% of its respective possible states. For example, a conventional 4×4 switch may include 16 reflectors whereas an embodiment of a 4×4 switch according to the present invention may include 5 switching reflectors and 2 non-switching reflectors. Also, fewer reflectors and actuators may be formed on a smaller substrate area, allowing a reduction in the footprint of an N×N switch according to the present invention.

Figure 4:
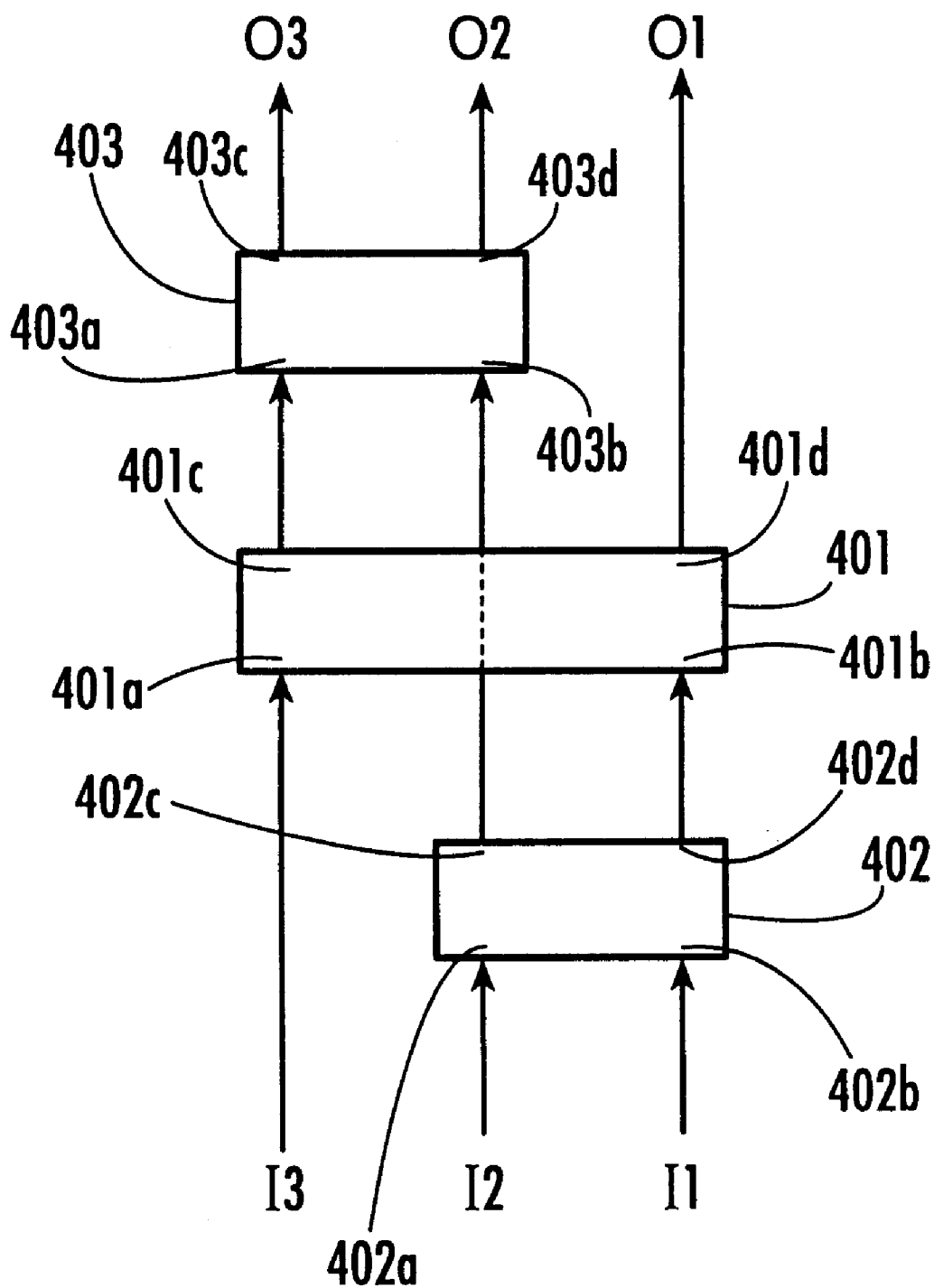
FIG. 4 is a block diagram that illustrates embodiments of a 3×3 MEM OXC switch according to the present invention.

FIG. 4 is a block diagram that illustrates embodiments of a 3×3 MEM OXC switch according to the present invention. According to FIG. 4, a reduced number of switches 401–403 can provide the interconnect needed to switch any of inputs I1–I3 to any of outputs O1–O3. As determined by equations (1) and (2), the 3×3 MEM OXC switch can include three switches to provide the needed 6 settings (3!) of the 3×3 MEM OXC switch.

Each of the switches 401–403 can operate as a 2×2 switch. In particular, each switch 401–403 can have 2 inputs and 2 outputs, wherein optical radiation present at the inputs can be directed to the outputs by switching the optical radiation or by passing the optical radiation through ("pass-through"). For example, switch 402 can switch optical radiation from an input 402a to an output 402d or can pass-through the optical radiation from the input 402a to an output 402c. Similarly, the switch 402 can switch optical radiation from an input 402b to the output 402c or pass-through the optical radiation from the input 402b to the output 402d.

The switches 401–403 can be coupled together to provide the overall function of a 3×3 switch. Accordingly, optical energy can be switched from any input I1, I2, and/or I3 to any output O1, O2, and/or O3. In particular, the switch 402 can switch optical energy from input I1 (402b) and/or input I1 (402a) to the switch 403 (via 402c) and/or to the switch 401 (via 402d). The switch 401 can switch received optical energy (401a, 401b) to the switch 403 (via 401c) and/or to the output O1 (via 401d). The switch 403 can switch received optical energy from the switch 401 (401a) and/or the switch 402 (401b) to the output O2 (via 403d) and/or to the output O3 (via 403c). The dashed line through the switch 401 indicates that the output 402c can be coupled to the input 403b without being switched by the switch 401.

Moreover, optical energy can be switched from a first input to a first output without blocking the switching of optical energy from a second input to a second output. For example, according to FIG. 4, switching optical energy from input I1 to output O2 does not block (or preclude) switching optical energy from input I1 to output O1 or to output O3.

Figure 5:
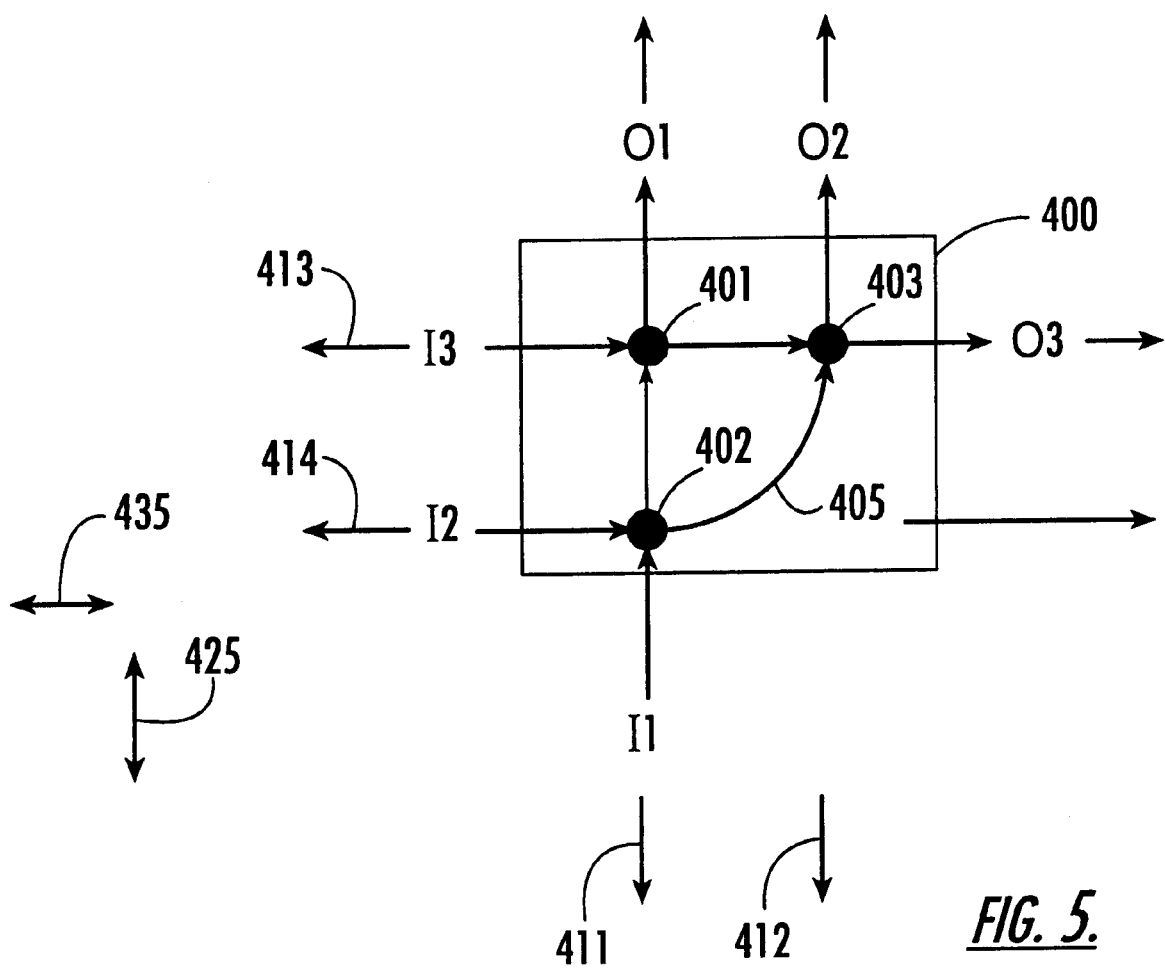
FIG. 5 is a schematic diagram that illustrates embodiments of a 3×3 MEM OXC switch according to the present invention.

FIG. 5 is a schematic diagram that illustrates embodiments of a 3×3 MEM OXC switch 400 according to the present invention. According to FIG. 5, a 2×2 array includes first and second columns and first and second rows that define first and second optical paths 411, 412 in a first direction 425 and third and fourth optical paths 413, 414 in a second direction 435. The optical paths are aligned with inputs and outputs of the MEM OXC switch.

In particular, input I1 is aligned with the first optical path 411, input I1 is aligned with the fourth optical path 414, and input I3 is aligned with the third optical path 413. Output O1 is aligned with the first optical path 411, output O2 is aligned with the second optical path 412, and output I3 is aligned with the third optical path 413.

As determined by, Equation (1), the 3×3 MEM OXC switch 400 includes the three switches or "switching nodes" 401–403 to provide the needed 6 settings (3!) of the 3×3 MEM OXC switch 400. The first, second, and third nodes 401–403 can selectively switch optical radiation from one optical path to another to propagate the optical radiation from any input to any output. For example, the first node 401 can switch optical radiation from the first optical path 411 to the third optical path 413 for output via the output I3 or the first node 401 can pass the optical radiation through to the input I1.

An optical transmission apparatus 405 can optically couple an output of the second node 402 to an input of the third node 403 for output via the output O2 or O3. The optical transmission apparatus 405 changes the direction of the propagation of optical radiation received from the second node 402 from the second direction 435 to the first direction 425 at the input to the third node 403.

In preferred embodiments, the optical transmission apparatus 405 is nonswitching. Accordingly, the optical transmission apparatus 405 can be a fixed reflector, a linear waveguide, a curvilinear waveguide and/or other apparatus that can change the direction of the propagation of the optical radiation. However, a switching apparatus also may be used, but need not be moved between reflecting and non-reflecting positions.

Figure 6:
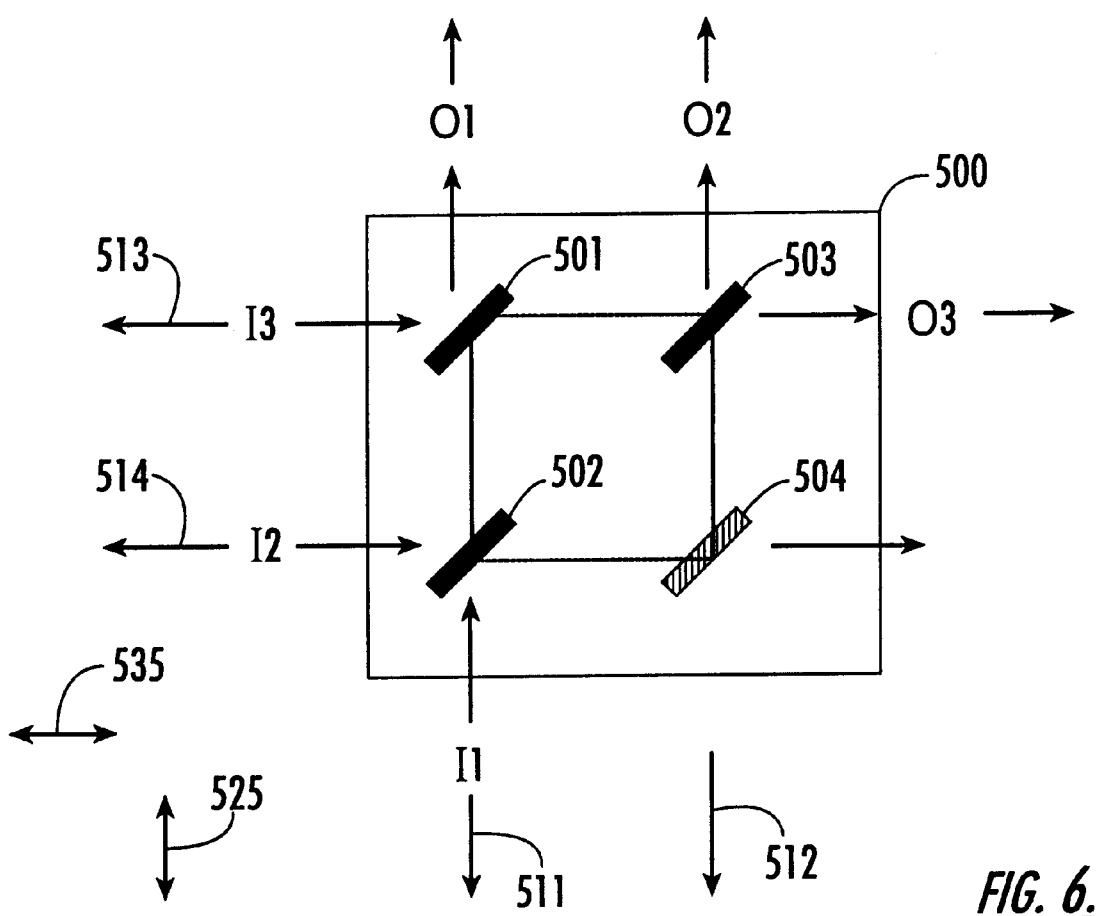
FIG. 6 is a plan view that illustrates embodiments of a 3×3 MEM OXC switch according to the present invention.

FIG. 6 is a plan view that illustrates embodiments of a 3×3 MEM OXC switch 500 according to the present invention. According to FIG. 6, a 2×2 array of reflectors 501–504 are arranged, as shown, in first and second columns and first and second rows to define first and second optical paths 511, 512 in a first direction 525 and third and fourth optical paths 513, 514 in a second direction 535. The optical paths are aligned with inputs and outputs of the MEM OXC switch 500.

In particular, input I1 is aligned with the first optical path 511, input I1 is aligned with the fourth optical path 514, and input I3 is aligned with the third optical path 513. Output O1 is aligned with the first optical path 511, output O2 is aligned with the second optical path 512, and output O3 is aligned with the third optical path. In a preferred embodiment, at least one of the inputs (here input I1) is located on a separate side of the MEM OXC 500 switch from the other inputs. In another embodiment, at least one of the outputs (here output O3) is located on a separate side of the MEM OXC switch 500 from the other outputs.

The first, second, and third reflectors 501–503 are moveable between a reflecting position and a non-reflecting position. The first, second, and third reflectors 501–503 are oriented 45 degrees relative to the optical paths and have reflective material on opposite surfaces. Accordingly, the first, second, and third reflectors 501–503 can be used to reflect or "switch" optical radiation from the inputs along the optical paths to propagate the optical radiation form any input to any output. The reflective material can be, for example, gold on silicon or gold on polysilicon. Other reflective materials may be used.

Figure 7:
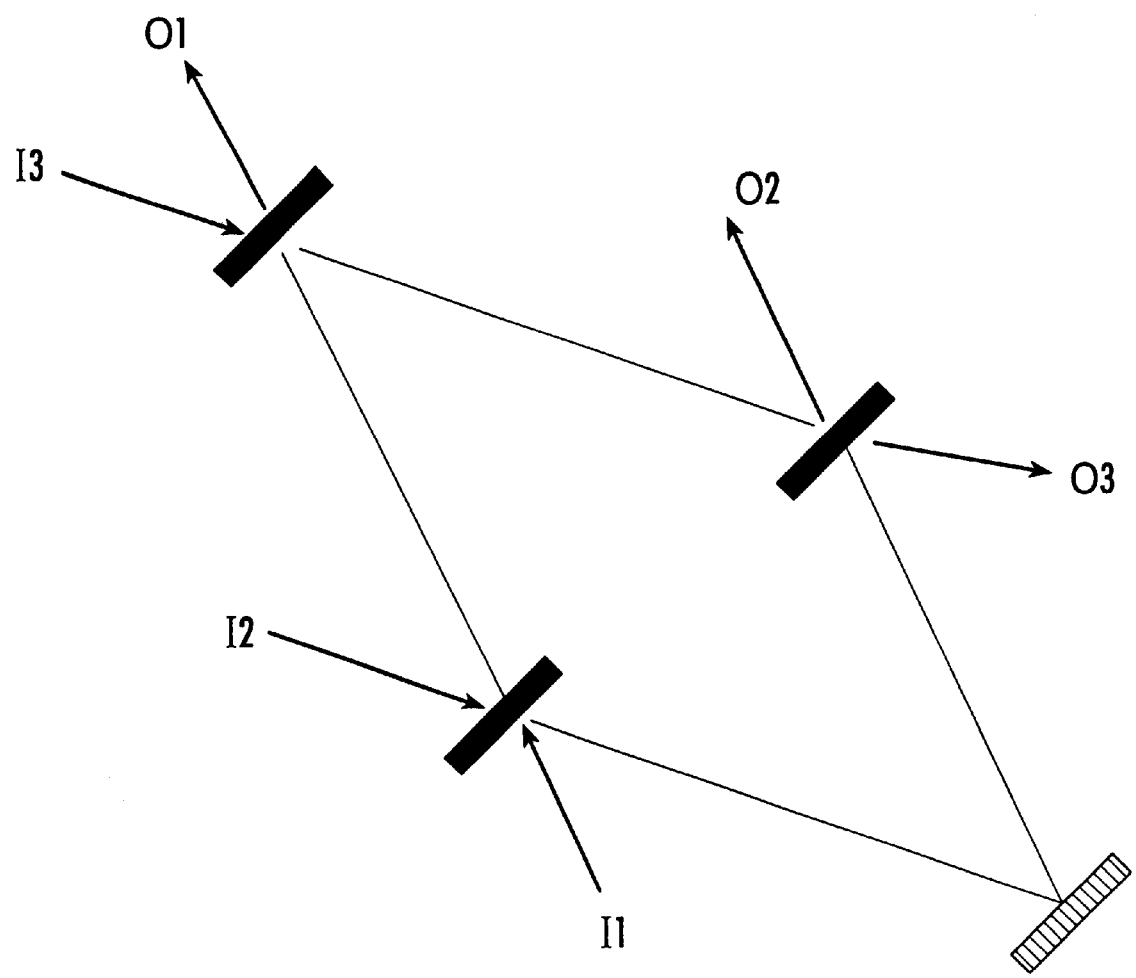
FIG. 7 is a plan view that illustrates non-orthogonal embodiments of a 3×3 MEM OXC switch according to the present invention.

FIG. 7 is a plan view that illustrates non-orthogonal embodiments of a 3×3 MEM OXC switch according to the present invention. It will be understood that the present invention can be embodied in switches that use reflectors that have nonorthogonal orientations with respect to each other, as shown, for example, in FIG. 7.

FIG. 8 is a table that illustrates the 6 switch settings for operations of a 3×3 MEM OXC switch according to the present invention. According to FIG. 8, a first switch setting optically couples the input I1 to the output O1, the input I1 to the output O2, and the input I3 to the output O3. A second switch setting optically couples the input I1 to the output O1, the input I1 to the output O3, and the input I3 to the output O2. A third switch setting optically couples the input I1 to the output O2, the input I1 to the output O1, and the input I3 to the output O3. A fourth switch setting optically couples the input I1 to the output O3, the input I1 to the output O2, and the input I3 to the output O1. A fifth switch setting optically couples the input I1 to the output O2, the input I1 to the output 3, and the input I3 to the output O1. A sixth switch setting optically couples the input I1 to the output 3, the input I1 to the output O1, and the input I3 to the output O2. Accordingly, the six switch settings of FIG. 8 allow any of the inputs to be optically coupled to any of the outputs.

FIGS. 9A–F is a series of plan views that illustrate embodiments of moveable reflector 601–605 positions for each of the six switch settings of FIG. 8 in a 3×3 MEM OXC switch 700 according to the present invention. As shown in FIG. 8, a 2×2 array of reflectors 701–704 are arranged, in first and second columns and first and second rows to define first and second optical paths 711, 712 in a first direction 725 and third and fourth optical paths 713, 714 in a second direction 735. The optical paths are aligned with inputs and outputs of the MEM OXC switch 700.

According to FIGS. 9A–9F, solid shading indicates that the corresponding moveable reflector 701–703 is in the reflecting position, no shading indicates that the reflector is in the non-reflecting position, and half-shading indicates that the reflector is fixed. When a moveable reflector is in the reflecting position, optical radiation incident along a first optical path reflects from the first optical path to a second optical path orthogonal to the first optical path. In contrast, when a moveable reflector is in the non-reflecting position, optical radiation incident along the first optical path will "pass-through" and continue to propagate along the first optical path.

As shown in FIG. 9A, in a first setting, first, second, and third moveable reflectors 701–703 are in the respective non-reflecting positions. Accordingly, optical radiation received at the input I1 "passes-through" to the output O1. Optical radiation received at the input I1 "passes-through" the second moveable reflector 702 and reflects from the fixed reflector 704 to the output O2, and optical radiation received at the input I3 "passes-through" to the output O3. Accordingly, the first setting can provide for 3 of the possible functions provided by the MEM OXC switch 200. In other words, the same setting may used to switch input I1 to output O1 or to switch input I1 to output O2 or to switch input I3 to output O3.

In a second setting, (FIG. 9B) the third moveable reflector 703 is in the reflecting position and the first and second reflectors 701–702 are in the non-reflecting position. Accordingly, optical radiation received at the input I1 "passes-through" to the output O1. Optical radiation received at the input I1 "passes-through" the second moveable reflector 702 and reflects from the fixed reflector 704 to the third moveable reflector 703 which reflects the optical energy to the output O3. Optical radiation received at the input I3 "passes-through" the first moveable reflector 701 and reflects from the third moveable reflector 703 to the output O2.

In a third setting, (FIG. 9C) the second moveable reflector 702 is in the reflecting position and the fist and third moveable reflectors 701, 703 are in the non-reflecting position. Accordingly, optical radiation received at the input I1 reflects from the second moveable reflector 702 and from the fixed reflector 704 and "passes-through" the third moveable reflector 703 to the output O2. Optical radiation received at the input I1 reflects from the second moveable reflector 702 and "passes-through" the first moveable reflector 701 to the output O1. Optical radiation received at the input I3 "passes-through" to the output O3.

In a fourth setting, (FIG. 9D) the first, second, and third moveable reflectors 701–703 are in the reflecting positions. Accordingly, optical radiation received at the input I1 reflects from the second moveable reflector 701 to the fixed reflector 704 to the third moveable reflector 703 to the output I3. Optical radiation received at the input I1 reflects from the second moveable reflector 702 to the first moveable reflector 701 to the third moveable reflector 703 to the output O2. Optical radiation received at the input I3 reflects from the first moveable reflector 701 to the output O1.

In an alternative fourth setting, (FIG. 9D') the first moveable reflector 701 is in the reflecting position and the second and third moveable reflectors 702, 703 are in the non-reflecting position. Accordingly, optical radiation received at the input I1 "passes through" the second moveable reflector 702 and reflects from the first moveable reflector 701 and "passes through" the third moveable reflector 703 to the output O3. Optical radiation received at the input I1 "passes through" the second moveable reflector 702 and reflects from the fixed reflector 704 and "passes through" the third moveable reflector 703 to the output O2. Optical radiation received at the input I3 reflects from the first moveable reflector 701 to the output O1.

The one of the alternative fourth settings may be chosen over the other based on the desired operation of the 4×4 MEM OXC switch. For example, one alternative fourth setting may be favored because it may provide fewer reflections in propagating the optical radiation from an input to an output or because the associated optical path is shorter.

In a fifth setting, (FIG. 9E) the first and second moveable reflectors 701, 702 are in the reflecting position and the third moveable reflector 703 is in the non-reflecting position. Accordingly, optical radiation received at the input I1 reflects from the second moveable reflector 702 to the fixed reflector 704 and "passes through" the third moveable reflector 703 to the output O2. Optical radiation received at the input I1 reflects from the second moveable reflector 702 to the first moveable reflector 701 and "passes though" the third moveable reflector 703 and the output O3. Optical radiation received at the input I3 reflects from the first moveable reflector 701 to the output O1.

In an alternative fifth setting, (FIG. 9E') the first and third moveable reflectors 701, 703 are in the reflecting position and the second moveable reflector 702 is in the non-reflecting position. Accordingly, optical radiation received at the input I1 "passes though" the second moveable reflector 702 and reflects from the first moveable reflector 701 and the third moveable reflector 703 to the output O2. Optical radiation received at the input I1 "passes through" the second moveable reflector 702 and reflects from the fixed reflector and the third moveable reflector 703 to the output O3. Optical radiation received at the input I3 reflects from the first moveable reflector 701 to the output O1.

In a sixth setting, (FIG. 9F) the second and third moveable reflectors 702, 703 are in the reflecting position and the first moveable reflector 701 is in the non-reflecting position. Accordingly, optical radiation received at the input I1 reflects from the second moveable reflector 702 and the fixed reflector 704 and the third moveable reflector 703 to the output O3. Optical radiation received at the input I1 reflects from the second moveable reflector 702 and "passes through" the first moveable reflector 701 to the output O1. Optical radiation received at the input I3 "passes-through" the first moveable reflector 701 and reflects from the third moveable reflector 703 to the output O2.

According to another aspect of the present invention, $(N^2-N)/2$ nodes can be utilized to create an N×N MEM OXC switch. In particular, the $(N^2-N)/2$ switching nodes can be located on one side of a diagonal of the N×N array. One or more optical transmission apparatus' are located at the internal array positions along the diagonal. Accordingly, N×N OXC switches according to the present invention may include more moveable reflectors than determined by Equation (1). For example, a 4×4 MEM OXC switch according to the present invention can use 6 moveable reflectors and 2 fixed reflector. An 8×8 MEM OXC switch may be created using 28 moveable reflectors. In contrast, using Equation (1), these switches may include fewer movable reflectors.

Figure 10:
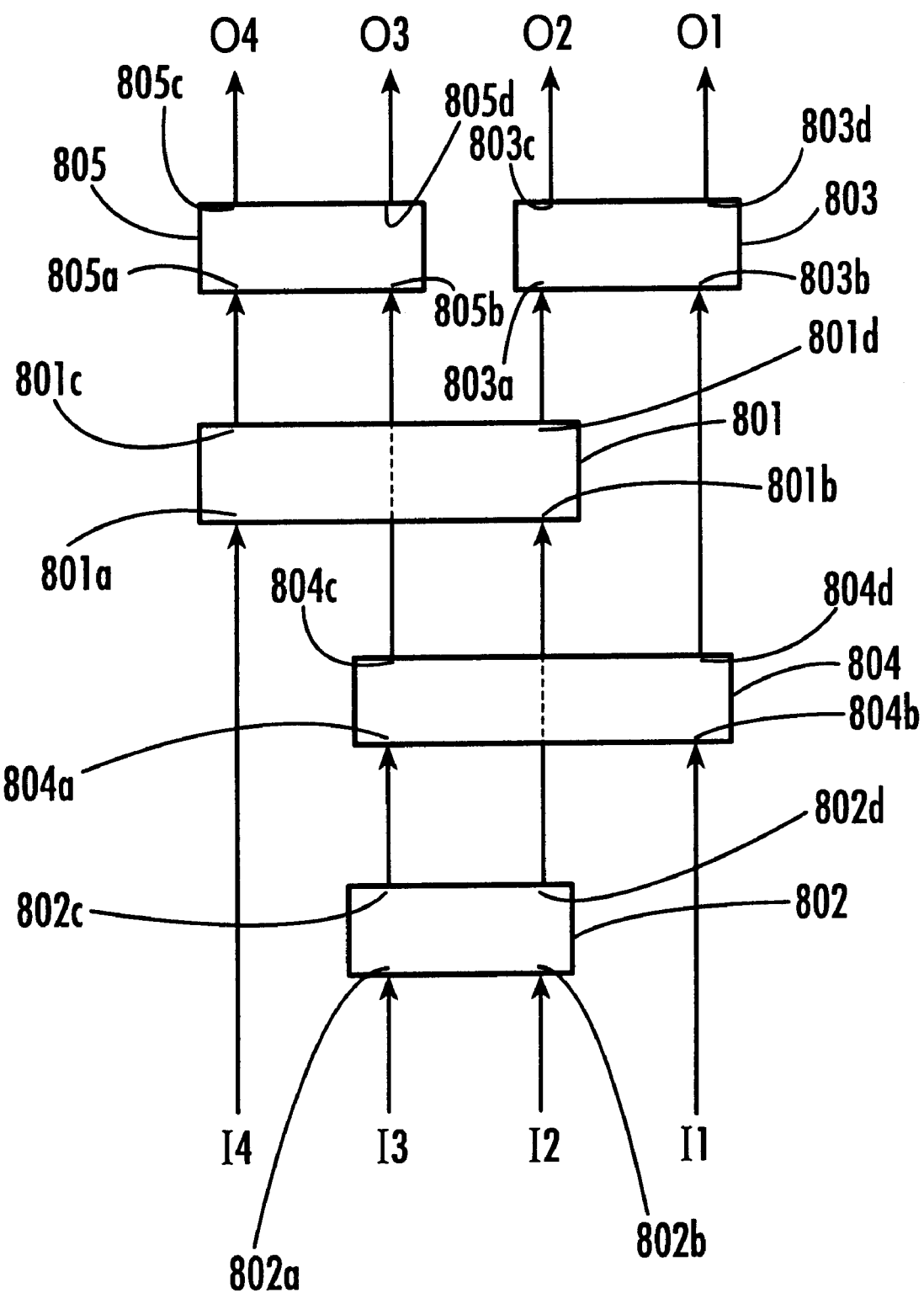
FIG. 10 is a block diagram that illustrates embodiments of a 4×4 MEM OXC switch according to the present invention.

FIG. 10 is a block diagram that illustrates embodiments of a 4×4 MEM OXC switch according to the present invention. According to FIG. 10, switches 801–805 can provide the interconnect needed to switch any of inputs I1–I4 to any of outputs O1–O4. As determined by equations (1) and (2), the 4×4 MEM OXC switch can include five switches to provide the needed 24 settings (4!) of the 4×4 MEM OXC switch.

In particular, each of the switches 801–805 can operate as a 2×2 switch. For example, switch 802 can switch optical energy from an input 802a to an output 802c and/or an output 802d. Similarly, the switch 802 can switch optical energy from an input 802b to the output 802c and/or the output 802d.

The switches 801–805 can be coupled together to provide the overall function of a 4×4 switch. Accordingly, optical energy can be switched from any input I1, I2, I3 and/or I4 to any output O1, O2, O3 and/or O4. In particular, the switch 802 can switch optical energy from the input I1 (802b) and/or input I3 (802a) to the switch 804 (via 802c) and/or to the switch 801 (via 802d). The switch 804 can switch optical energy from the switch 802 (via 804a) and/or input I1 (via 804b) to the switch 805 (via 804c) and/or to the switch 803 (via 804d).

The switch 801 can switch received optical energy (801a, 801b) to the switch 805 (via 801c) and/or to the switch 803 (via 801d). The switch 803 can switch received optical energy from the switch 801 (via 803a) and/or the switch 804 (via 803b) to the output O2 (via 803c) and/or to the output O1 (via 803d). The switch 805 can switch received optical energy from the switch 801 (via 805a) and/or the switch 804 (via 805b) to the output O4 (via 805c) and/or to the output O3 (via 805d).

The dashed line through the switch 804 indicates that the output 802d can be coupled to the input 801b without being switched by the switch 801. The dashed line through the switch 801 indicates that the output 804c can be coupled to the input 805b without being switched by the switch 801.

Figure 11:
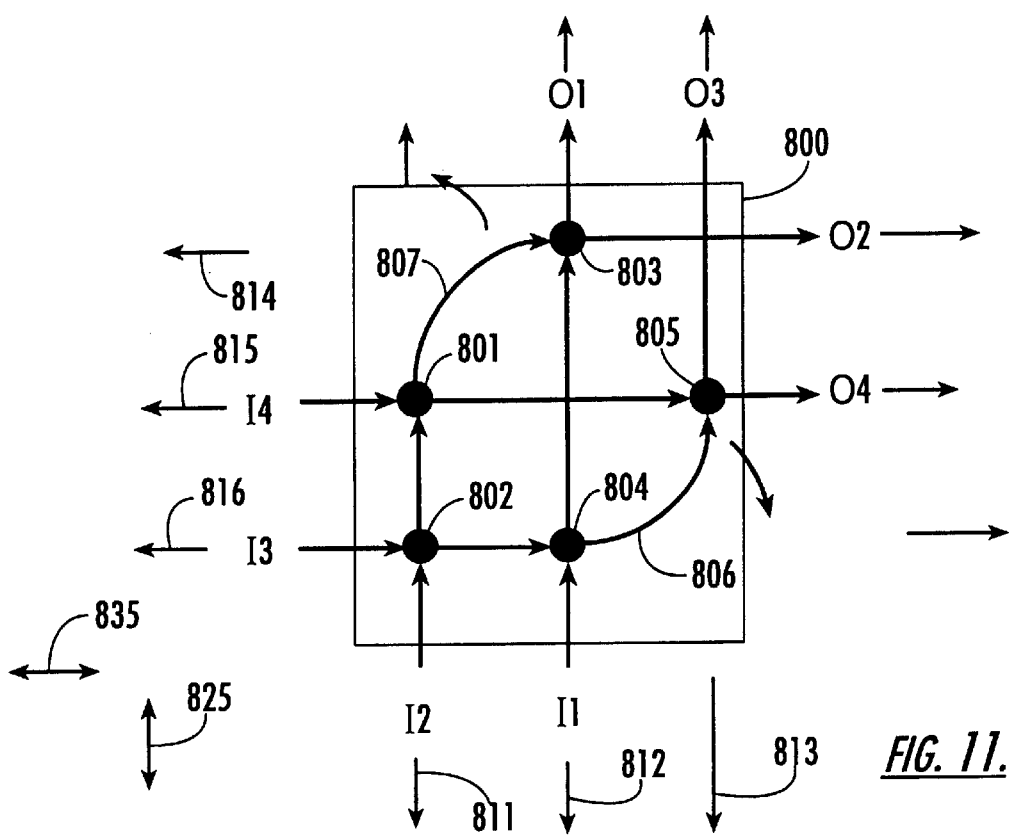
FIG. 11 is a schematic diagram that illustrates embodiments of a 4×4 MEM OXC switch according to the present invention.

FIG. 11 is a schematic diagram that illustrates embodiments of a 4×4 MEM OXC switch 800 according to the present invention. According to FIG. 11, a 3×3 array includes first, second, and third columns and first, second, and rows columns to define first, second, and third optical paths 811–813 in a first direction 825 and fourth, fifth, and sixth optical paths 814–816 in a second direction 835. The optical paths are aligned with inputs and outputs of the 4×4 MEM OXC switch 800.

In particular, input I1 is aligned with the second optical path 812, input I1 is aligned with the first optical path 811, input I3 is aligned with the sixth optical path 816, and input I4 is aligned with the fifth optical path 815. Output O1 is aligned with the second optical path 812, output O2 is aligned with the fourth optical path 814, output I3 is aligned with the third optical path 813, and output I4 is aligned with the fifth optical path 815.

First through fifth nodes 801–805 can selectively switch optical radiation from one optical path to another to propagate the optical radiation from any input to any output. For example, the second node 802 can switch optical radiation from the first optical path 811 to the sixth optical path 816 for transmission to the fourth node 804 or can pass the optical radiation through to the first node 801.

A first optical transmission apparatus 806 can selectively optically couple an output of the fourth node 804 to an input of the fifth node 805 for output via the output I3 or I4. The optical transmission apparatus 806 changes the direction of the propagation of the optical radiation received from the fourth node 804 from the second direction 835 to the first direction 825 at the input to the fifth node 805.

A second optical transmission apparatus 807 can optically couple an output of the first node 801 to an input of the third node 803 for output via the output O1 or O2. The optical transmission apparatus 807 changes the direction of the propagation of optical radiation received from the first node 801 from the first direction 825 to the second direction 835 at the input to the third node 803.

The first and second optical transmission apparatus 806, 807 are not switched. Accordingly, the first and second optical transmission apparatus 806, 807 can be fixed reflectors, linear waveguides, curvilinear waveguides or other apparatus that can change the direction of the propagation of the optical radiation.

Figure 12:
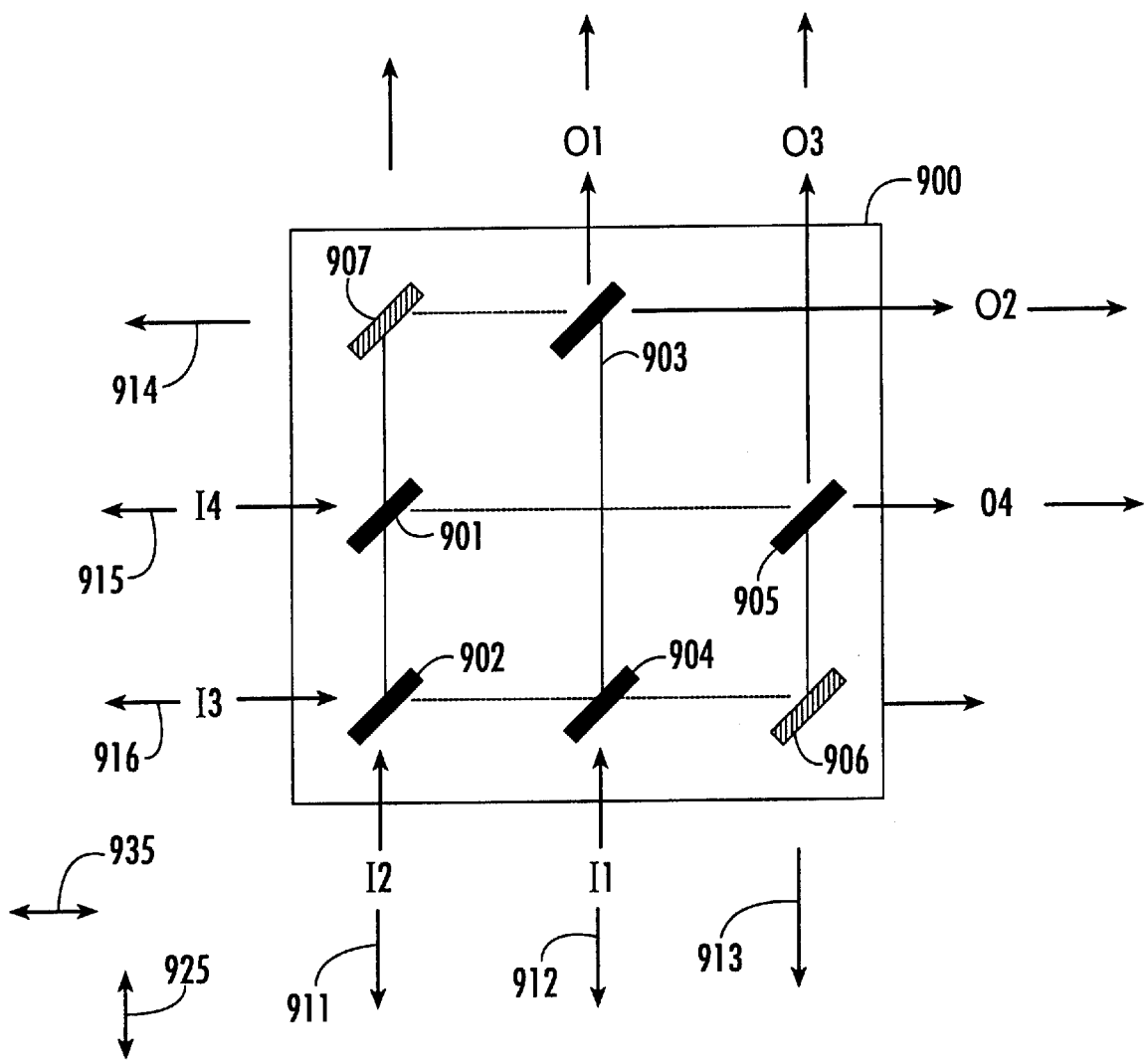
FIG. 12 is a plan view that illustrates embodiments of a 4×4 MEM OXC switch according to the present invention.

FIG. 12 is a plan view that illustrates embodiments of a 4×4 MEM OXC switch 900 according to the present invention. According to FIG. 12, an array of first through seventh reflectors 901–907 are arranged, as shown, in first-third columns and first-third rows to define first, second, and third optical paths 911–913 in a first direction 925 and fourth, fifth, and sixth optical paths 914–916 in a second direction 935. The optical paths are aligned with inputs and outputs of the MEM OXC switch 900.

In particular, input I1 is aligned with the second optical path 912, input I1 is aligned with the first optical path 911, input I3 is aligned with the sixth optical path 916, and input I4 is aligned with the fifth optical path 915. Output O1 is aligned with the second optical path 912, output O2 is aligned with the fourth optical path 914, output O3 is aligned with the third optical path 913, and output O4 is aligned with the fifth optical path 915. In a preferred embodiment, at least one of the inputs is located on a separate side of the MEM OXC switch 900 from the other inputs. In another embodiment, at least one of the outputs is located on a separate side of the MEM OXC switch 900 from the other outputs.

The first through fifth reflectors 901–905 are moveable between a reflecting position and a non-reflecting position. The first through fifth moveable reflectors 901–905 are oriented 45 degrees relative to, the optical paths and have reflective material on opposite surfaces thereof. The sixth and seventh reflectors 906, 907 are fixed. Accordingly, the first through fifth reflectors 901–905 can be used to reflect or "switch" optical radiation from the inputs along the optical paths therein to propagate the optical radiation from any input to any output. The reflective material can be, for example, gold on silicon or gold on polysilicon. Other reflective materials may be used.

Figure 14A:
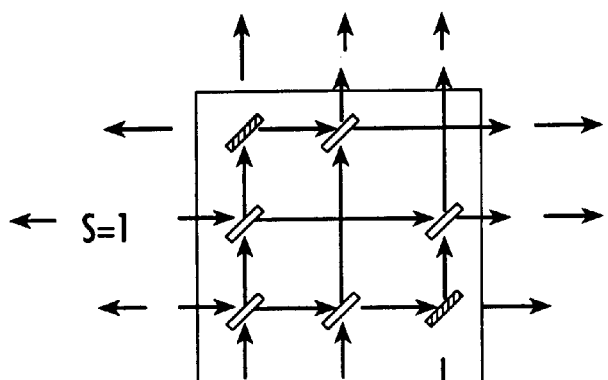
FIGS. 14A–14Y' is a series of plan views that illustrate embodiments of first through fifth moveable reflectors in reflecting and non-reflecting positions for 24 switch settings of FIG. 13 according to the present invention.
Figure 14B:
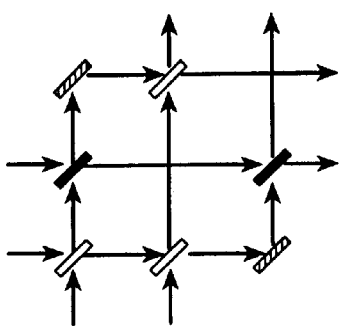
Figure 14C:
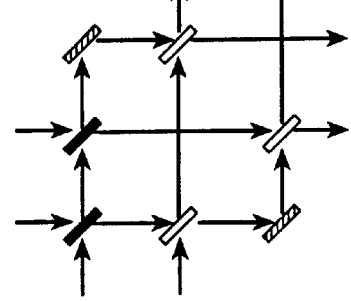
Figure 14D:
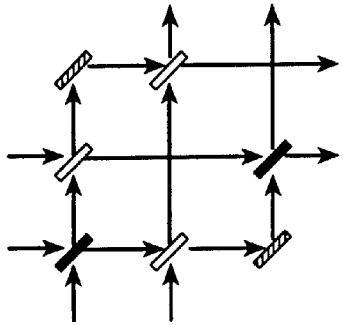
Figure 14E:
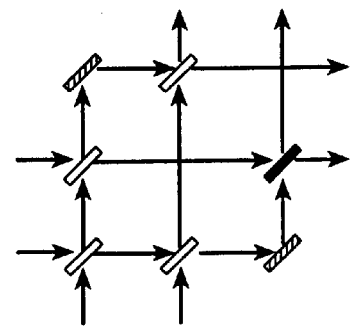
Figure 14F:
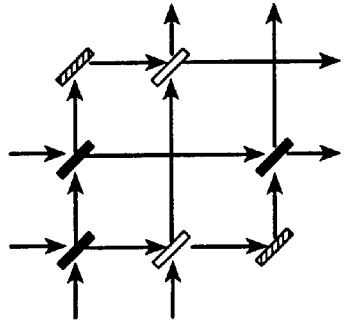
Figure 14F:
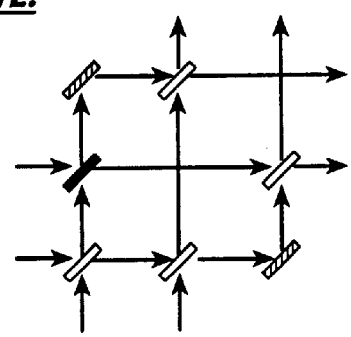
Figure 14G:
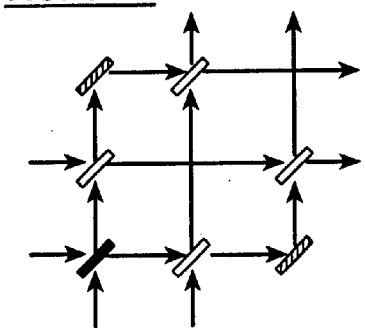
Figure 14H:
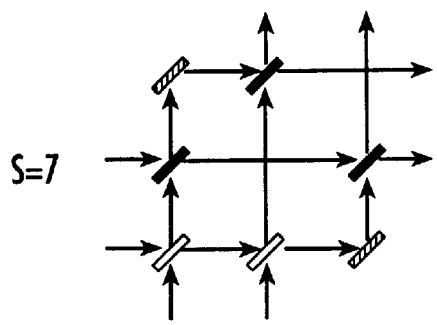
Figure 14H:
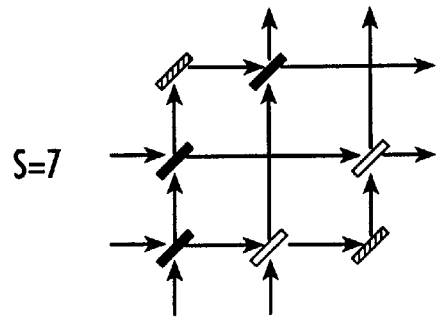
Figure 14I:
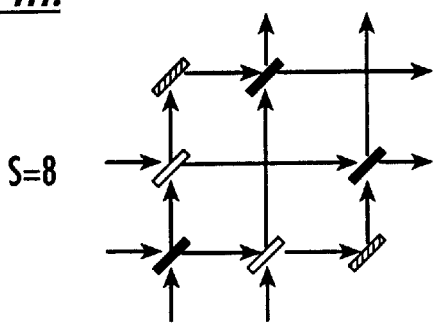
Figure 14J:
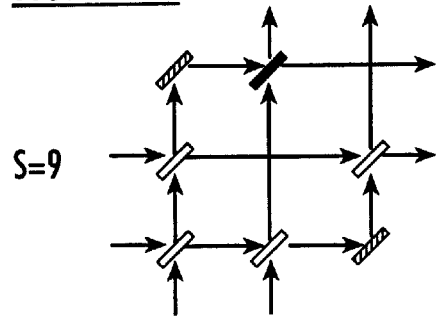
Figure 14K:
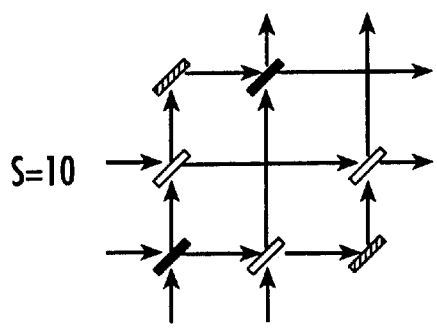
Figure 14L:
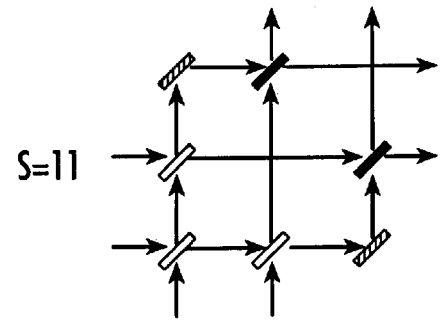
Figure 14M:
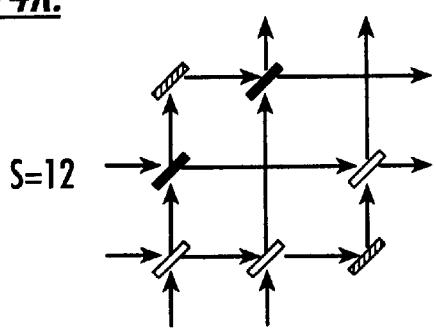
Figure 14M:
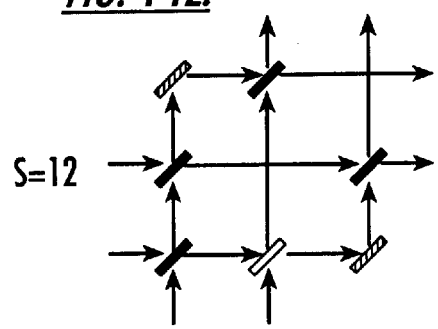
Figure 14N:
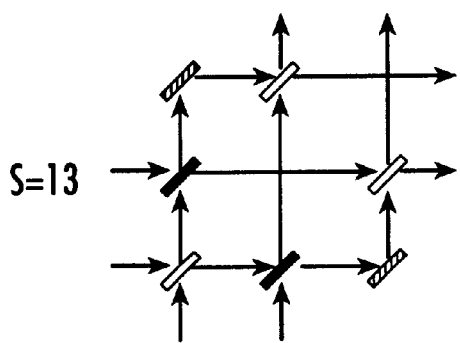
Figure 14O:
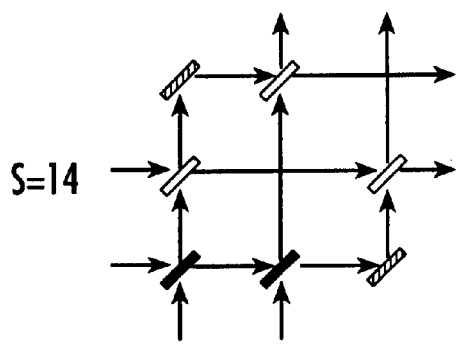
Figure 14O:
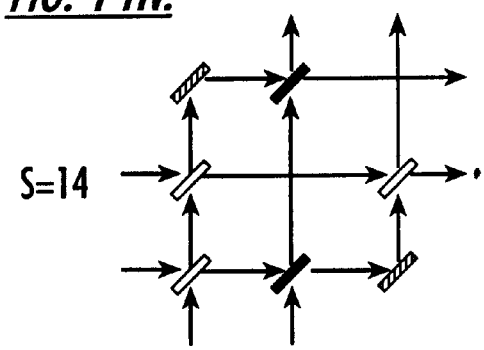
Figure 14P:
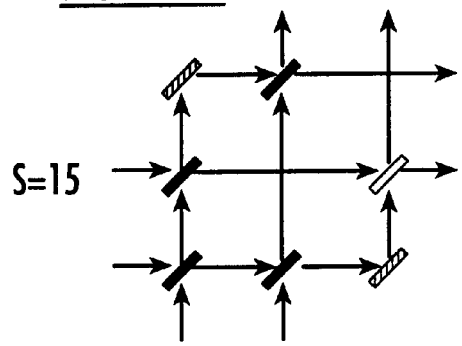
Figure 14Q:
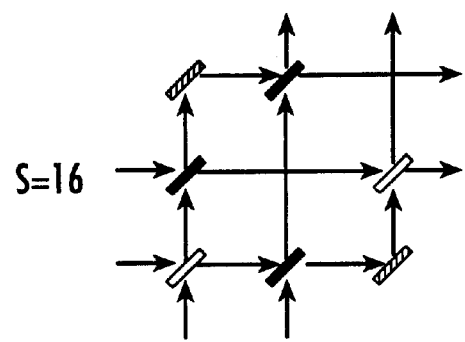
Figure 14R:
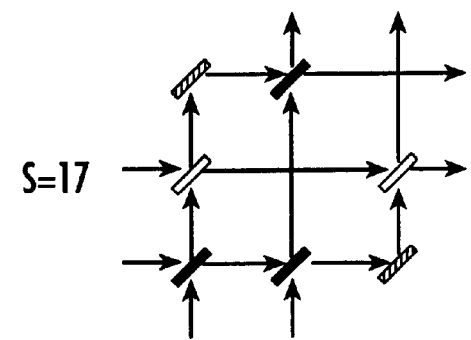
Figure 14R:
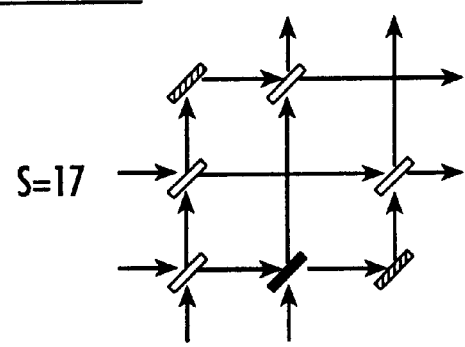
Figure 14S:
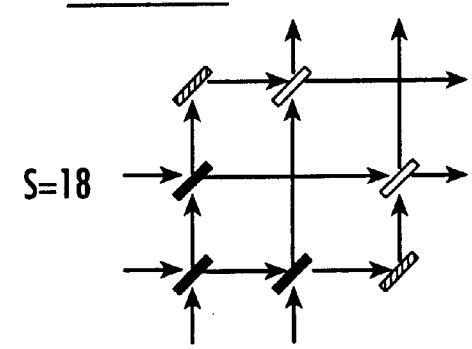
Figure 14T:
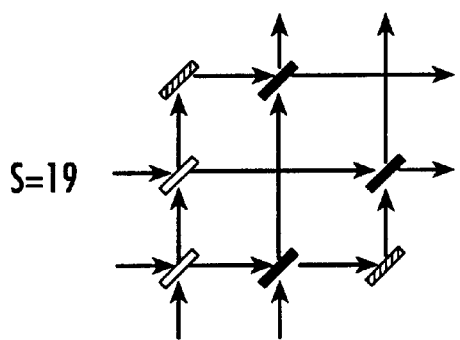
Figure 14U:
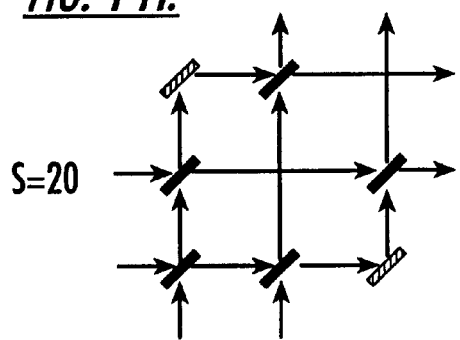
Figure 14W:
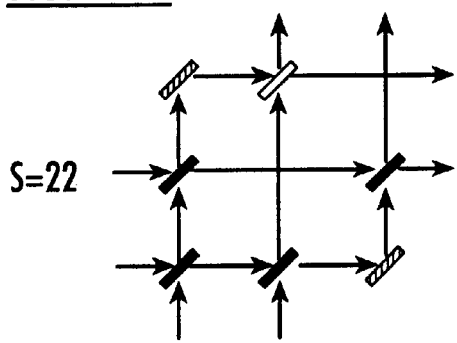
Figure 14Y:
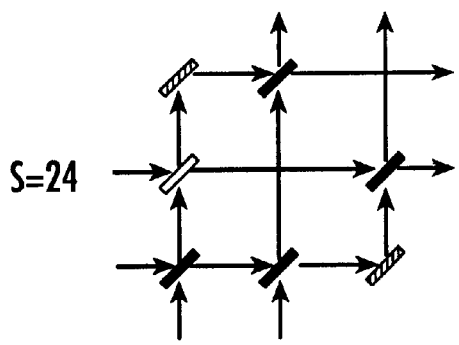
Figure 14T:
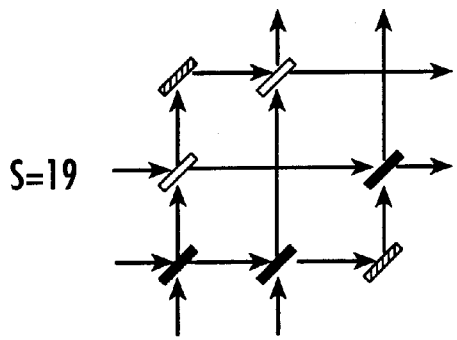
Figure 14V:
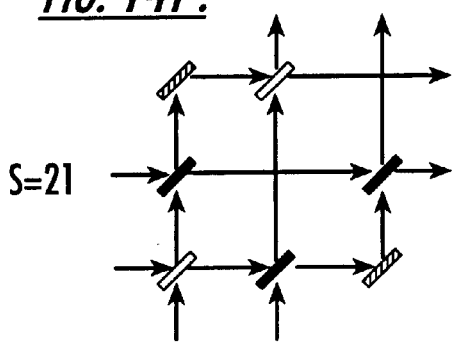
Figure 14X:
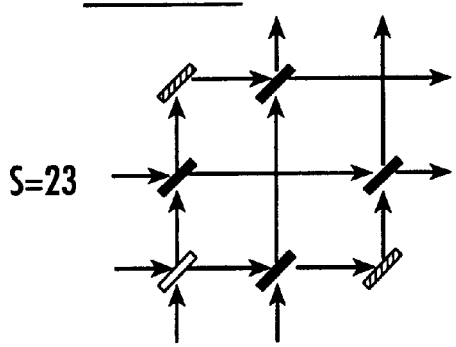
Figure 14Y:
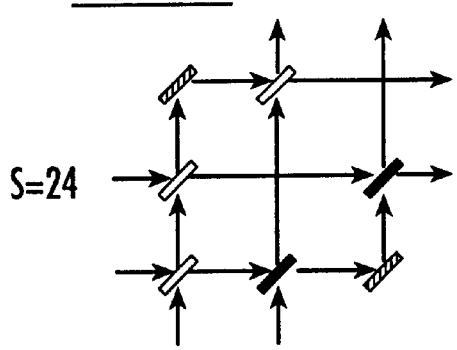

FIG. 13 is a table that illustrates 24 switch settings for operations of a 4×4 MEM OXC switch according to the present invention. FIGS. 14A–Y' is a series of plan views that illustrate embodiments of first through fifth moveable reflectors 901–905 in reflecting and non-reflecting positions for each of the 24 switch settings of FIG. 13 according to the present invention. A detailed explanation of each of FIGS. 14A–14Y' need not be provided because the reflectors can be positioned as shown in FIGS. 14A–14Y' to provide the 24 settings needed.

Figure 15:
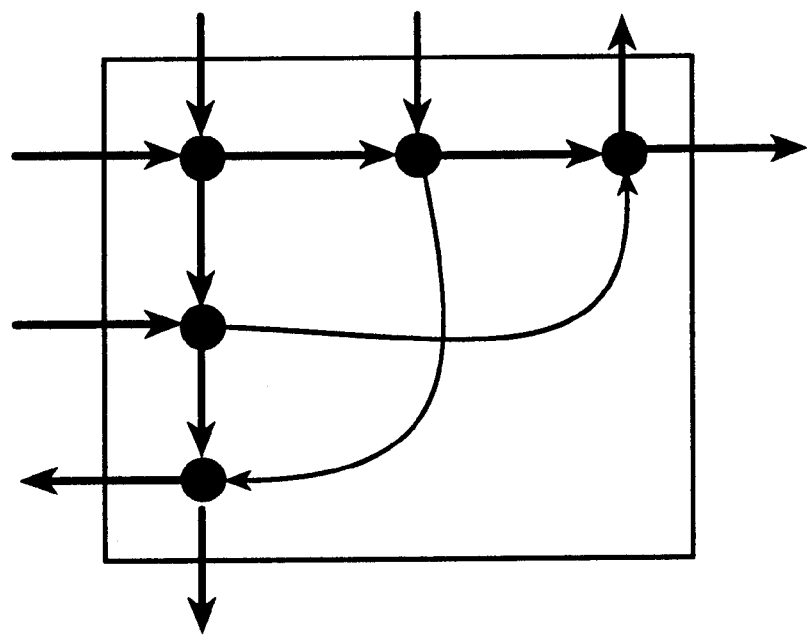
FIG. 15 is a schematic diagram that illustrates another embodiment of a 4×4 MEM OXC switch including 5 switching nodes and first and second optical transmission apparatus according to the present invention.
Figure 16:
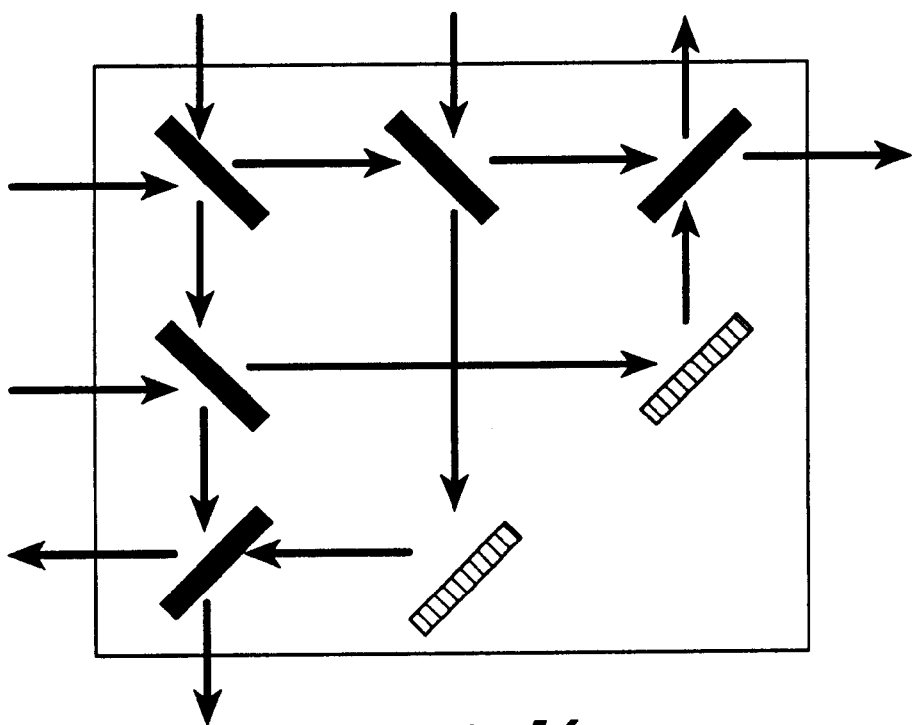
FIG. 16 is a plan view that illustrates another embodiment of a 4×4 MEM OXC switch including 5 moveable reflectors and 2 fixed reflectors according to the present invention.

FIG. 15 is a schematic diagram that illustrates another embodiment of a 4×4 MEM OXC switch including 5 switching nodes and first and second optical transmission apparatus according to the present invention. FIG. 16 is a plan view that illustrates another embodiment of a 4×4 MEM OXC switch including 5 moveable reflectors and 2 fixed reflectors according to the present invention.

Figure 17:
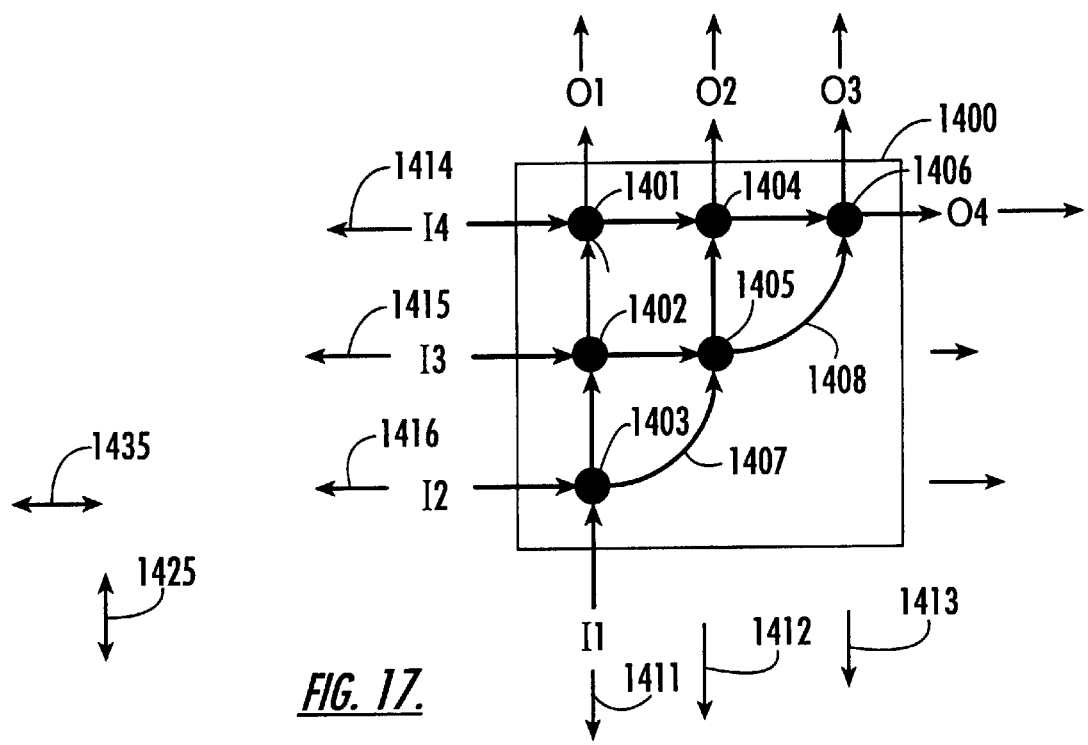
FIG. 17 is a schematic diagram that illustrates another embodiment of a 4×4 MEM OXC switch including 6 switching nodes and first and second optical transmission apparatus according to the present invention.

FIG. 17 is a schematic diagram that illustrates another embodiment of a 4×4 MEM OXC switch 1400 including 6 switching nodes and first and second optical transmission apparatus according to the present invention. According to FIG. 17, a 3×3 array includes first, second, and third rows and first, second, and third columns that define first, second, and third optical paths 1411–1413 in a first direction 1425 and fourth, fifth, and sixth optical paths 1414–1416 in a second direction 1435. The optical paths are aligned with inputs and outputs of the 4×4 MEM OXC switch 1400.

In particular, input I1 is aligned with the first optical path 1411, input I1 is aligned with the sixth optical path 1416, input I3 is aligned with the fifth optical path 1415, and input I4 is aligned with the fourth optical path 1414. Output O1 is aligned with the first optical path 1411, output O2 is aligned with the second optical path 1412, output O3 is aligned with the third optical path 1413, and output O4 is aligned with the fourth optical path 1414.

First through sixth nodes 1401–1406 can selectively switch optical radiation from one optical path to another to propagate the optical radiation from any input to any output. For example, the fifth node 1405 can switch optical radiation from the fifth optical path 1415 to the second optical path 1412 for transmission to the fourth node 1404 or can pass the optical radiation through to the sixth node 1406.

A first optical transmission apparatus 1407 can optically couple an output of the third node 1403 to an input of the fifth node 1405. The first optical transmission apparatus 1407 changes the direction of the propagation of optical radiation received from the third node 1403 from the second direction 1435 to the first direction 1425 at the input to the fifth node 1405.

A second optical transmission apparatus 1408 can optically couple an output of the fifth node 1405 to an input of the sixth node 1406 for output via the output O3 or O4. The second optical transmission apparatus 1408 changes the direction of the propagation of optical radiation received from the fifth node 1405 from the second direction 1435 to the first direction 1425 at the input to the sixth node 1406.

In FIGS. 15 and 16, the number of switching nodes/ moveable reflectors can be determined by application of Equation (1). In particular the 4×4 OXC switches of FIGS. 15 and 16 can include 5 switching nodes/moveable reflectors. In contrast to FIG. 11, the moveable reflectors of FIG. 16 may be oriented in different directions.

The first and second optical transmission apparatus 1407, 1408 are not switched. Accordingly, the first and second optical transmission apparatus 1407, 1408 can be fixed reflectors, linear waveguides, curvilinear waveguides or other apparatus that can change the direction of the propagation of the optical radiation.

As described above, $(N^2-N)/2$ switching nodes can be utilized to create the embodiments illustrated by FIG. 17. For example, in the 4×4 OXC switch 1400 shown in FIG. 17, $(N^2-N)/2$ (or nodes 1401–1406) can be located on one side of a diagonal of a 4×4 array where the interenal array positions of the 4×4 array are populated by first and second optical transmission apparatus.

According to the present invention, a number of reflectors used to provide the functionality of an N×N MEM OXC switch can be reduced. In particular, the reduced number of reflectors can be expressed as: ceiling [ln(N!)/ln(2)]. Reducing the number of reflectors used in an N×N MEM OXC switch may allow for N×N switches that use fewer actuators than conventional N×N switches. Also, fewer reflectors and actuators may be formed on a smaller substrate area, allowing a reduction in the footprint of the N×N switch according to the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed:

1. An N×N Optical Cross-Connect (OXC) switch comprising:

N inputs to the OXC switch, where N is at least 3;

N outputs from the OXC switch, wherein the N×N OXC switch provides N! states, wherein the N! states optically couple any one of the N inputs to any one of the N outputs;

a number of switching nodes, selectively optically coupled to the N inputs and N outputs, wherein each of the number of switching nodes is configurable in at least one of a switching configuration and a pass-through configuration on a per input basis to provide selectively switched optical radiation therefrom and wherein the number of switching nodes is equal to ceiling [ln(N!)/ln(2)] to provide the N! states of the N×N OXC switch; and at least one optical transmission apparatus optically coupled to at least two of the switching nodes.

2. An N×N Optical Cross-Connect (OXC) switch according to claim 1, wherein the number of switching nodes is less than or equal to $(N^2-N)/2$ to provide the N! states of the N×N OXC switch.

3. An N×N Optical Cross-Connect (OXC) switch according to claim 1, wherein the at least two of the switching nodes are located in different rows and different columns of the N×N OXC, wherein the optical transmission apparatus comprises at least one of a linear waveguide and a curvilinear waveguide.

4. An N×N Optical Cross-Connect (OXC) switch according to claim 1, wherein the first switching node comprises a movable reflector that reflects optical radiation when in a reflecting position and does not reflect optical radiation when in a non-reflecting position.

5. An N×N Optical Cross-Connect (OXC) switch according to claim 1, wherein the a first number of the N inputs are oriented orthogonal to a second number of the N inputs.

6. An N×N Optical Cross-Connect (OXC) switch according to claim 1, wherein a first number of the N outputs are oriented orthogonal to a second number of the N outputs.

7. An N×N Optical Cross-Connect (OXC) switch according to claim 1, wherein the first switching node comprises a moveable reflector having reflective material on opposite surfaces.

8. An N×N Optical Cross-Connect (OXC) switch comprising:

N inputs to the OXC switch, where N is at least 3;

N outputs from the OXC switch, wherein the N×N OXC switch provides N! states, wherein the N! states optically couple any one of the N inputs to any one of the N outputs;

a number of switching nodes, selectively optically coupled to the N inputs and N outputs, wherein each of the number of switching nodes is configurable in at least one of a switching configuration and a pass-through configuration on a per input basis to provide selectively switched optical radiation therefrom and wherein the number of switching nodes is equal to ceiling [ln(N!)/ln(2)] to provide the N! states of the N×N OXC switch; and at least one optical transmission apparatus optically coupled to at least two of the switching nodes, wherein the optical transmission apparatus comprises a non-moveable reflector.

9. An Optical Cross-Connect (OXC) switch comprising:
a first movable reflector optically coupled to a first input and a second input, wherein the first movable reflector receives first optical radiation in a first direction via the first input and receives second optical radiation in a second direction via the second input and provides the first optical radiation to a first output therefrom that propagates in the first direction when the first moveable reflector is in a non-reflecting position and provides the second optical radiation to the first output that propa-gates in the first direction when the first moveable reflector is in a reflecting position;

a second movable reflector that provides optical radiation from a third input thereto in the second direction to a second output therefrom when the second moveable reflector is in the non-reflecting position; and an optical transmission apparatus that optically couples the first output of the first moveable reflector to the third input of the second movable reflector, wherein the optical transmission apparatus changes the direction of propagation of the optical radiation at the first output from the first direction to the second direction at the third input, wherein the optical transmission apparatus comprises a fixed reflector.

10. An Optical Cross-Connect (OXC) switch according to claim 9, wherein the optical transmission apparatus comprises at least one of a linear waveguide, a curvilinear waveguide, and free-space.

11. An Optical Cross-Connect (OXC) switch according to claim 9, wherein the first movable reflector comprises a movable reflector that reflects optical radiation when in the reflecting position and does not reflect optical radiation when in the non-reflecting position.

12. An Optical Cross-Connect (OXC) switch according to claim 9, wherein the first input to the first moveable reflector is oriented orthogonal to the second input.

13. An Optical Cross-Connect (OXC) switch according to claim 9, wherein the first moveable reflector comprises a moveable reflector having reflective material on opposite surfaces.

14. An Optical Cross-Connect (OXC) switch according to claim 9, wherein the first moveable reflector moves between a reflecting position along an optical path from the first input to the first output and a non-reflecting position outside the optical path.

15. A 3×3 Optical Cross-Connect (OXC) switch comprising:

a 2×2 array of positions arranged in first and second rows and first and second columns, wherein the first and second columns define first and second optical paths in a first direction respectively and the first and second rows define third and fourth optical paths in the second direction respective;

a first input to the 3×3 OXC switch in the first direction aligned with the first optical path;

a second input to the 3×3 OXC switch in the second direction aligned with the fourth optical path;

a third input to the 3×3 OXC switch in the second direction aligned with the third optical path;

a first output from the 3×3 OXC switch in the first direction aligned with the first optical path;

a second output from the 3×3 OXC switch in the first direction aligned with the second optical path;

a third output from the 3×3 OXC switch in the second direction aligned with the third optical path;

a first moveable reflector positioned in the first row and the first column of the 2×2 array that reflects optical radiation from the first optical path to the third optical path and from the third input to the first output in a reflecting position and that does not reflect optical radiation in a non-reflecting position;

a second moveable reflector positioned in the second row and the first column of the 2×2 array that reflects optical radiation from the first optical path to the fourth optical path and from the second input to the first optical path in the reflecting position and that does not reflect optical radiation in the non-reflecting position;

a third moveable reflector positioned in the first row and the second column of the 2×2 array that reflects optical radiation from the second optical path to the third output and from the third optical path to the second output in the reflecting position and that does not reflect optical radiation in the non-reflecting position; and an optical transmission apparatus aligned with the second row and the second column of the 2×2 array, wherein optical transmission apparatus changes a direction of propagation of optical radiation in the second row from the second direction to the first direction.

16. A 3×3 Optical Cross-Connect (OXC) switch according to claim 15, wherein the optical transmission apparatus comprises a non-moveable reflector positioned in the second row and the second column of the 2×2 array.

17. A 3×3 Optical Cross-Connect (OXC) switch according to claim 15, wherein the optical transmission apparatus comprises at least one of a curvilinear waveguide, a linear waveguide, and free-space.

18. A 3×3 Optical Cross-Connect (OXC) switch according to claim 15, wherein the first moveable reflector comprises a moveable reflector having reflective material on opposite first and second reflector surfaces.

19. A 4×4 Optical Cross-Connect (OXC) switch comprising:

a 3×3 array of positions arranged in first, second, and third rows and first, second, and third columns, wherein the first, second, and third columns define first, second, and third optical paths in a first direction respectively and the first, second, and third rows define fourth, fifth, and sixth optical paths in the second direction respectively, a first input to the 4×4 OXC switch in the first direction aligned with the second optical path;

a second input to the 4×4 OXC switch in the first direction aligned with the first optical path;

a third input to the 4×4 OXC switch in the second direction aligned with sixth optical path;

a fourth input to the 4×4 OXC switch in the second direction aligned with the fifth optical path;

a first output from the 4×4 OXC switch in the first direction aligned with the second optical path;

a second output from the 4×4 OXC switch in the second direction aligned with the fourth optical path;

a third output from the 4×4 OXC switch in the first direction aligned with the third optical path;

a fourth output from the 4×4 OXC switch in the second direction aligned with the fifth optical path;

a first moveable reflector positioned in the third row and the first column of the 3×3 array that reflects optical radiation from the first optical path to the sixth optical path and from the sixth optical path to first optical path in a reflecting position and that does not reflect optical radiation in a non-reflecting position;

a second moveable reflector positioned in the second row and the first column of the 3×3 array that reflects optical radiation from the first optical path to the fifth optical, path and from the fifth optical path to the first optical path in the reflecting position and that does not reflect optical radiation in the non-reflecting position;

a third moveable reflector positioned in the third row and the second column of the 3×3 array that reflects optical radiation from the second optical path to the sixth optical path and from the sixth optical path to the second optical path in the reflecting position and that does not reflect optical radiation in the non-reflecting position;

a fourth moveable reflector positioned in the first row and the second column of the 3×3 array that reflects optical radiation from the second optical path to the fourth optical path and from the fourth optical path to the second optical path in the reflecting position and does not reflect optical radiation in the non-reflecting position;

a fifth moveable reflector positioned in the second row and the third column of the 3×3 array that reflects optical radiation from the fifth optical path to the third optical path and from the third optical path to the fifth optical path in the reflecting position and that does not reflect optical radiation in the non-reflecting position; and an optical transmission apparatus aligned with the first row and the first column of the 3×3 array, wherein optical transmission apparatus changes a direction of propagation of optical radiation in the first row from the second direction to the first direction.

20. A 4×4 Optical Cross-Connect (OXC) switch according to claim 19 further comprising:

a second optical transmission apparatus aligned with the third row and the third column of the 3×3 array, wherein optical radiation changes the a direction of propagation of optical radiation from the first direction to the second direction.

21. A 4×4 Optical Cross-Connect (OXC) switch according to claim 19, wherein the optical transmission apparatus comprises a non-moveable reflector positioned in the first row and the first column of the 3×3 array that reflects optical radiation from the first optical path to the fourth optical path.

22. A 4×4 Optical Cross-Connect (OXC) switch according to claim 19, wherein the optical transmission apparatus comprises at least one of a curvilinear waveguide, a linear waveguide, and free-space.

23. A 4×4 Optical Cross-Connect (OXC) switch according to claim 19, wherein the moveable reflectors comprise moveable reflectors having reflective material on respective opposite first and second reflector surfaces.

24. An Optical Cross-Connect (OXC) switch comprising:

an input to the OXC switch oriented in a first direction;

an output from the OXC switch oriented in a second direction, orthogonal to the first direction;

a moveable reflector, optically coupled to the input, wherein the moveable reflector switches optical radiation from the input to provide reflected optical radiation in the second direction; and an optical transmission apparatus, optically coupled to the moveable reflector and the output, wherein the optical transmission apparatus changes a direction of propagation of the optical radiation from the input in the first direction to the second direction, wherein the optical transmission apparatus comprises at least one of a nonmoveable reflector, a curvilinear waveguide, and a linear waveguide.

25. A method of operating an N×N Optical Cross-Connect (OXC) switch, the method comprising:

selecting one of a number of reflector configurations of the OXC switch such that a selected one of N inputs thereto is switched to any selected one of N outputs thereof;

configuring a plurality of reflectors in the selected one of a number of reflector configurations, wherein the number of the plurality of switching reflectors is equal to ceiling $[\ln(N!)/\ln(2)]$.

26. A method according to claim 25, wherein the plurality of reflectors comprise moveable reflectors that move between a reflecting position and a non-reflecting position.

27. A method of operating an N×N Optical Cross-Connect (OXC) switch, the method comprising:

selecting one of a number of reflector configurations of the OXC switch such that a selected one of N inputs thereto is switched to any selected one of N outputs thereof; and configuring a plurality of reflectors in the selected one of a number of reflector configurations, wherein the number of the plurality of switching reflectors is equal to ceiling $[\ln(!)\ln(2)]$, the method further comprising:

propagating optical radiation from the selected input to the selected output via an optical path that includes at least one of the plurality of reflectors and at least one fixed reflector.

28. A method according to claim 27, wherein the at least one fixed reflector comprises a reflector that remains in the reflecting position.

29. An Optical Cross-Connect (OXC) switch comprising:

a first switching node, optically coupled to first and second inputs thereto, wherein the first switching node receives first optical radiation at the first input in a first direction and receives second optical radiation at the second input in a second direction, wherein the first switching node selectively switches at least one of first and second optical radiations from the first and second inputs to a first output therefrom in the second direction to provide switched optical radiation;

a second switching node, wherein the second switching node receives the switched optical radiation in the first direction at a third input thereto and selectively switches the switched optical radiation from the third input to a second output therefrom; and a non-switching node, optically coupled to the first output and to the third input, wherein the non-switching node changes the direction of propagation of the switched optical radiation at the first output from the second direction to the first direction at the third input.

30. An Optical Cross-Connect (OXC) switch according to claim 29, wherein the non-switching node comprises a non-moveable reflector.

31. An Optical Cross-Connect (OXC) switch according to claim 29, wherein the non-switching node comprises at least one of a linear waveguide, a curvilinear waveguide, and free-space.

32. An Optical Cross-Connect (OXC) switch according to claim 29, wherein the first switching node comprises a movable reflector that reflects optical radiation when in the reflecting position and does not reflect optical radiation when in the non-reflecting position.

33. An Optical Cross-Connect (OXC) switch according to claim 29, wherein the first input to the first moveable reflector is oriented orthogonal to the second input.

34. An Optical Cross-Connect (OXC) switch according to claim 29, wherein the first switching node comprises a moveable reflector having reflective material on opposite surfaces.

* * * * *